US010268980B1

(12) United States Patent
Gindin et al.

(10) Patent No.: US 10,268,980 B1
(45) Date of Patent: Apr. 23, 2019

(54) REPORT GENERATION BASED ON USER RESPONSIBILITY

(71) Applicant: Apptio, Inc., Bellevue, WA (US)

(72) Inventors: Jay Randolf Gindin, Bellevue, WA (US); Paul Damien McLachlan, Newcastle, WA (US)

(73) Assignee: Apptio, Inc., Bellevue, WA (US)

( * ) Notice: Subject to any disclaimer, the term of this patent is extended or adjusted under 35 U.S.C. 154(b) by 0 days.

(21) Appl. No.: 15/858,945

(22) Filed: Dec. 29, 2017

(51) Int. Cl.
| *G06Q 10/00* | (2012.01) |
| *G06Q 10/06* | (2012.01) |
| G06F 3/0482 | (2013.01) |
| H04L 29/06 | (2006.01) |
| G06F 17/24 | (2006.01) |
| G06F 17/21 | (2006.01) |
| G06F 3/0484 | (2013.01) |

(52) U.S. Cl.
CPC ..... *G06Q 10/067* (2013.01); *G06Q 10/06315* (2013.01); *G06F 3/0482* (2013.01); *G06F 3/04842* (2013.01); *G06F 17/218* (2013.01); *G06F 17/248* (2013.01); *H04L 67/42* (2013.01)

(58) Field of Classification Search
CPC .......... G06Q 10/00; G06Q 50/00; G06F 1/00; G06F 21/00
USPC ................................................ 705/7.11–7.42
See application file for complete search history.

(56) References Cited

U.S. PATENT DOCUMENTS

| 4,744,026 A | 5/1988 | Vanderbei |
| 5,249,120 A | 9/1993 | Foley |
| 5,615,121 A | 3/1997 | Babayev et al. |
| 5,721,919 A | 2/1998 | Morel et al. |
| 5,758,327 A | 5/1998 | Gardner et al. |
| 5,799,286 A * | 8/1998 | Morgan ............. G06Q 10/0631 705/30 |
| 5,802,508 A | 9/1998 | Morgenstern |
| 5,903,453 A | 5/1999 | Stoddard, II |
| 5,970,476 A | 10/1999 | Fahey |
| 5,991,741 A | 11/1999 | Speakman et al. |

(Continued)

FOREIGN PATENT DOCUMENTS

JP 2011134268 A 7/2011

OTHER PUBLICATIONS

US 5,649,211 A, 04/1997, Horkin et al. (withdrawn)

(Continued)

*Primary Examiner* — Alan S Miller
(74) *Attorney, Agent, or Firm* — John W. Branch; Lowe Graham Jones PLLC

(57) ABSTRACT

Embodiments are directed towards generating reports for visualizing data models. A RACI engine may obtain RACI information for a user. A report engine may provide metadata associated with a report for visualizing the data model. The report engine may be arranged to provide anchor points in the data model based on the metadata, the RACI information. The report engine may be arranged to provide a report template based on the anchor points, the RACI information, and the metadata such that the report template includes references to data objects selected automatically based on the metadata and the anchor points. The report engine may display a report based on the report template that provides visualizations based on values associated with the data objects.

24 Claims, 13 Drawing Sheets

(56) References Cited

U.S. PATENT DOCUMENTS

| | | | |
|---|---|---|---|
| 6,014,640 A * | 1/2000 | Bent | G06Q 40/02 705/30 |
| 6,032,123 A | 2/2000 | Jameson | |
| 6,047,290 A | 4/2000 | Kennedy et al. | |
| 6,208,993 B1 | 3/2001 | Shadmon | |
| 6,249,769 B1 | 6/2001 | Ruffin et al. | |
| 6,253,192 B1 | 6/2001 | Corlett et al. | |
| 6,308,166 B1 | 10/2001 | Breuker et al. | |
| 6,321,207 B1 | 11/2001 | Ye | |
| 6,330,552 B1 | 12/2001 | Farrar et al. | |
| 6,336,138 B1 * | 1/2002 | Caswell | H04L 41/12 345/440 |
| 6,424,969 B1 | 7/2002 | Gruenwald | |
| 6,507,825 B2 | 1/2003 | Suh | |
| 6,578,005 B1 | 6/2003 | Lesaint et al. | |
| 6,594,672 B1 * | 7/2003 | Lampson | G06F 17/30592 |
| 6,647,370 B1 | 11/2003 | Fu et al. | |
| 6,738,736 B1 | 5/2004 | Bond | |
| 6,789,252 B1 | 9/2004 | Burke et al. | |
| 6,832,212 B1 | 12/2004 | Zenner et al. | |
| 6,839,719 B2 | 1/2005 | Wallace | |
| 6,877,034 B1 | 4/2005 | Machin et al. | |
| 6,882,630 B1 | 4/2005 | Seaman | |
| 6,965,867 B1 | 11/2005 | Jameson | |
| 6,983,321 B2 | 1/2006 | Trinon et al. | |
| 7,050,997 B1 | 5/2006 | Wood, Jr. | |
| 7,130,822 B1 | 10/2006 | Their et al. | |
| 7,149,700 B1 | 12/2006 | Munoz et al. | |
| 7,177,850 B2 | 2/2007 | Argenton et al. | |
| 7,263,527 B1 | 8/2007 | Malcolm | |
| 7,305,491 B2 | 12/2007 | Miller et al. | |
| 7,308,427 B1 | 12/2007 | Hood | |
| 7,321,869 B1 | 1/2008 | Phibbs, Jr. | |
| 7,386,535 B1 | 6/2008 | Kalucha et al. | |
| 7,418,438 B2 * | 8/2008 | Gould | G06Q 10/06 |
| 7,505,888 B2 * | 3/2009 | Legault | G06F 17/30554 703/22 |
| 7,590,937 B2 | 9/2009 | Jacobus et al. | |
| 7,634,431 B2 | 12/2009 | Stratton | |
| 7,653,449 B2 | 1/2010 | Hunter et al. | |
| 7,664,729 B2 * | 2/2010 | Klein | H04L 41/024 707/693 |
| 7,703,003 B2 * | 4/2010 | Payne | G06F 17/243 715/234 |
| 7,725,343 B2 | 5/2010 | Johanson et al. | |
| 7,742,961 B2 | 6/2010 | Aaron et al. | |
| 7,752,077 B2 | 7/2010 | Holden et al. | |
| 7,769,654 B1 | 8/2010 | Hurewitz | |
| 7,774,458 B2 | 8/2010 | Trinon et al. | |
| 7,783,759 B2 | 8/2010 | Eilam et al. | |
| 7,801,755 B2 * | 9/2010 | Doherty | G06Q 10/06 705/7.13 |
| 7,805,400 B2 * | 9/2010 | Teh | G06Q 10/10 707/600 |
| 7,813,948 B2 | 10/2010 | Ratzloff | |
| 7,852,711 B1 | 12/2010 | Fitzgerald et al. | |
| 7,870,051 B1 | 1/2011 | En et al. | |
| 7,877,742 B2 | 1/2011 | Duale et al. | |
| 7,899,235 B1 | 3/2011 | Williams et al. | |
| 7,917,555 B2 * | 3/2011 | Gottumukkala | G06F 17/30259 707/953 |
| 7,930,396 B2 | 4/2011 | Trinon et al. | |
| 7,933,861 B2 | 4/2011 | Zadorozhny | |
| 7,945,489 B2 | 5/2011 | Weiss et al. | |
| 7,966,235 B1 | 6/2011 | Capelli et al. | |
| 8,010,584 B1 | 8/2011 | Craver et al. | |
| 8,024,241 B2 | 9/2011 | Bailey et al. | |
| 8,073,724 B2 * | 12/2011 | Harthcryde | G06Q 10/00 705/7.13 |
| 8,175,863 B1 | 5/2012 | Ostermeyer et al. | |
| 8,195,524 B2 | 6/2012 | Sandholm et al. | |
| 8,200,518 B2 | 6/2012 | Bailey et al. | |
| 8,200,561 B1 | 6/2012 | Scott et al. | |
| 8,209,218 B1 | 6/2012 | Basu et al. | |
| 8,260,959 B2 | 9/2012 | Rudkin et al. | |
| 8,370,243 B1 | 2/2013 | Cernyar | |
| 8,396,775 B1 | 3/2013 | Mindlin | |
| 8,423,428 B2 | 4/2013 | Grendel et al. | |
| 8,484,355 B1 | 7/2013 | Lochhead et al. | |
| 8,533,904 B2 | 9/2013 | Conrad | |
| 8,543,438 B1 | 9/2013 | Fleiss | |
| 8,600,830 B2 * | 12/2013 | Hoffberg | G06Q 30/0207 705/26.3 |
| 8,601,263 B1 | 12/2013 | Shankar et al. | |
| 8,655,714 B2 | 2/2014 | Weir et al. | |
| 8,667,385 B1 | 3/2014 | Mui et al. | |
| 8,766,981 B2 * | 7/2014 | McLachlan | G06Q 10/06313 345/440 |
| 8,768,976 B2 | 7/2014 | McLachlan et al. | |
| 8,826,230 B1 * | 9/2014 | Michelsen | G06F 8/34 717/109 |
| 8,935,301 B2 * | 1/2015 | Chmiel | G06Q 10/10 707/805 |
| 8,937,618 B2 * | 1/2015 | Erez | G06T 11/206 345/440 |
| 8,970,476 B2 | 3/2015 | Chan | |
| 8,996,552 B2 * | 3/2015 | Munkes | G06F 17/30967 707/760 |
| 9,015,692 B1 | 4/2015 | Clavel | |
| 9,020,830 B2 | 4/2015 | Purpus et al. | |
| 9,104,661 B1 | 8/2015 | Evans | |
| 9,213,573 B2 | 12/2015 | French et al. | |
| 9,281,012 B2 * | 3/2016 | Hedges | H04L 67/12 |
| 9,384,511 B1 * | 7/2016 | Purpus | G06F 17/30368 |
| 9,529,863 B1 * | 12/2016 | Gindin | G06Q 40/00 |
| 9,805,311 B1 | 10/2017 | Mohler | |
| 2002/0002557 A1 | 1/2002 | Straube et al. | |
| 2002/0016752 A1 | 2/2002 | Suh | |
| 2002/0056004 A1 | 5/2002 | Smith | |
| 2002/0069102 A1 | 6/2002 | Vellante et al. | |
| 2002/0082966 A1 | 6/2002 | O'Brien et al. | |
| 2002/0107914 A1 * | 8/2002 | Charisius | G06Q 10/06 709/203 |
| 2002/0123945 A1 | 9/2002 | Booth et al. | |
| 2002/0145040 A1 | 10/2002 | Grabski | |
| 2002/0156710 A1 | 10/2002 | Ryder | |
| 2002/0178198 A1 | 11/2002 | Steele | |
| 2002/0194329 A1 | 12/2002 | Alling | |
| 2003/0019350 A1 | 1/2003 | Khosla | |
| 2003/0033191 A1 * | 2/2003 | Davies | G06Q 10/06 705/7.14 |
| 2003/0074269 A1 | 4/2003 | Viswanath | |
| 2003/0083388 A1 | 5/2003 | L'Alloret | |
| 2003/0083888 A1 | 5/2003 | Argenton et al. | |
| 2003/0083912 A1 | 5/2003 | Covington et al. | |
| 2003/0093310 A1 | 5/2003 | Macrae | |
| 2003/0110113 A1 | 6/2003 | Martin | |
| 2003/0139960 A1 | 7/2003 | Nishikawa et al. | |
| 2003/0139986 A1 | 7/2003 | Roberts, Jr. | |
| 2003/0158724 A1 | 8/2003 | Uchida | |
| 2003/0158766 A1 * | 8/2003 | Mital | G06Q 10/0639 706/47 |
| 2003/0172018 A1 | 9/2003 | Chen et al. | |
| 2003/0172368 A1 | 9/2003 | Alumbaugh et al. | |
| 2003/0195780 A1 | 10/2003 | Arora et al. | |
| 2003/0208493 A1 * | 11/2003 | Hall | G06F 17/30607 |
| 2003/0217033 A1 * | 11/2003 | Sandler | G06F 17/30333 |
| 2003/0233301 A1 | 12/2003 | Chen et al. | |
| 2003/0236721 A1 | 12/2003 | Plumer et al. | |
| 2004/0030628 A1 | 2/2004 | Takamoto et al. | |
| 2004/0039685 A1 | 2/2004 | Hambrecht et al. | |
| 2004/0059611 A1 | 3/2004 | Kananghinis et al. | |
| 2004/0059679 A1 | 3/2004 | Mizumachi et al. | |
| 2004/0073477 A1 | 4/2004 | Heyns et al. | |
| 2004/0093344 A1 | 5/2004 | Berger et al. | |
| 2004/0111509 A1 | 6/2004 | Eilam et al. | |
| 2004/0133876 A1 * | 7/2004 | Sproule | G06Q 10/063 717/105 |
| 2004/0138942 A1 * | 7/2004 | Pearson | G06Q 10/06 705/7.11 |
| 2004/0186762 A1 | 9/2004 | Beaven et al. | |
| 2004/0243438 A1 | 12/2004 | Mintz | |

(56) References Cited

U.S. PATENT DOCUMENTS

| | | |
|---|---|---|
| 2004/0249737 A1 | 12/2004 | Tofte |
| 2005/0004856 A1 | 1/2005 | Brose et al. |
| 2005/0033631 A1 | 2/2005 | Wefers et al. |
| 2005/0038788 A1 | 2/2005 | Dettinger et al. |
| 2005/0044224 A1 | 2/2005 | Jun et al. |
| 2005/0060298 A1 | 3/2005 | Agapi et al. |
| 2005/0060317 A1 | 3/2005 | Lott et al. |
| 2005/0071285 A1 | 3/2005 | Laicher et al. |
| 2005/0091102 A1 | 4/2005 | Retsina |
| 2005/0120032 A1 | 6/2005 | Liebich et al. |
| 2005/0131929 A1* | 6/2005 | Bailey ............... G06F 17/30592 |
| 2005/0144110 A1 | 6/2005 | Chen et al. |
| 2005/0171918 A1 | 8/2005 | Eden et al. |
| 2005/0235020 A1 | 10/2005 | Gabelmann et al. |
| 2005/0246482 A1 | 11/2005 | Gabelmann et al. |
| 2006/0010156 A1 | 1/2006 | Netz et al. |
| 2006/0010294 A1 | 1/2006 | Pasumansky et al. |
| 2006/0041458 A1 | 2/2006 | Ringrose et al. |
| 2006/0041501 A1 | 2/2006 | Tabata et al. |
| 2006/0059032 A1* | 3/2006 | Wong .................. G06Q 10/06 705/348 |
| 2006/0074980 A1* | 4/2006 | Sarkar ................ G06F 17/3089 |
| 2006/0080264 A1 | 4/2006 | Zhang et al. |
| 2006/0085302 A1 | 4/2006 | Weiss et al. |
| 2006/0085465 A1* | 4/2006 | Nori .................. G06F 17/30297 |
| 2006/0106658 A1 | 5/2006 | Johanson et al. |
| 2006/0116859 A1* | 6/2006 | Legault ............. G06F 17/30554 703/22 |
| 2006/0116975 A1* | 6/2006 | Gould .................. G06Q 10/06 |
| 2006/0126552 A1 | 6/2006 | Lee et al. |
| 2006/0136281 A1 | 6/2006 | Peters et al. |
| 2006/0143219 A1* | 6/2006 | Smith ..................... G06Q 10/06 |
| 2006/0161879 A1 | 7/2006 | Lubrecht et al. |
| 2006/0167703 A1 | 7/2006 | Yakov |
| 2006/0178960 A1 | 8/2006 | Lepman |
| 2006/0179012 A1 | 8/2006 | Jacobs |
| 2006/0190497 A1 | 8/2006 | Inturi et al. |
| 2006/0200400 A1 | 9/2006 | Hunter et al. |
| 2006/0200477 A1 | 9/2006 | Barrenechea |
| 2006/0212146 A1* | 9/2006 | Johnson ............... G05B 19/042 700/89 |
| 2006/0212334 A1 | 9/2006 | Jackson |
| 2006/0224740 A1 | 10/2006 | Sievers-Tostes |
| 2006/0224946 A1 | 10/2006 | Barrett et al. |
| 2006/0228654 A1 | 10/2006 | Sanjar et al. |
| 2006/0235785 A1 | 10/2006 | Chait et al. |
| 2006/0277074 A1* | 12/2006 | Einav .................. G16H 10/60 705/3 |
| 2006/0282429 A1 | 12/2006 | Hernandez-Sherrington et al. |
| 2007/0038494 A1* | 2/2007 | Kreitzberg ............ G06Q 10/10 358/1.9 |
| 2007/0088641 A1 | 4/2007 | Aaron et al. |
| 2007/0113289 A1 | 5/2007 | Blumenau |
| 2007/0118516 A1 | 5/2007 | Li et al. |
| 2007/0124162 A1 | 5/2007 | Mekyska |
| 2007/0129892 A1 | 6/2007 | Smartt et al. |
| 2007/0179975 A1* | 8/2007 | Teh ....................... G06Q 10/10 |
| 2007/0198317 A1* | 8/2007 | Harthcryde ............ G06Q 10/00 705/7.14 |
| 2007/0198982 A1 | 8/2007 | Bolan et al. |
| 2007/0214413 A1 | 9/2007 | Boeckenhauer |
| 2007/0226090 A1 | 9/2007 | Stratton |
| 2007/0260532 A1 | 11/2007 | Blake, III |
| 2007/0271203 A1 | 11/2007 | Delvat |
| 2007/0276755 A1 | 11/2007 | Rapp |
| 2007/0282626 A1 | 12/2007 | Zhang et al. |
| 2008/0027957 A1* | 1/2008 | Bruckner ........... G06F 17/30412 |
| 2008/0033774 A1 | 2/2008 | Kimbrel et al. |
| 2008/0059945 A1* | 3/2008 | Sauer .................... G06Q 10/10 717/105 |
| 2008/0060058 A1* | 3/2008 | Shea ..................... G06F 21/604 726/4 |
| 2008/0065435 A1 | 3/2008 | Ratzloff |
| 2008/0071844 A1 | 3/2008 | Gopal et al. |
| 2008/0082186 A1* | 4/2008 | Hood ................... G05B 19/042 700/83 |
| 2008/0082435 A1 | 4/2008 | O'Brien et al. |
| 2008/0120122 A1 | 5/2008 | Olenski et al. |
| 2008/0201269 A1 | 8/2008 | Hollins et al. |
| 2008/0201297 A1* | 8/2008 | Choi .................... G06F 16/951 |
| 2008/0208647 A1 | 8/2008 | Hawley et al. |
| 2008/0208667 A1* | 8/2008 | Lymbery ................ G06Q 10/06 705/7.26 |
| 2008/0222638 A1 | 9/2008 | Beaty et al. |
| 2008/0239393 A1 | 10/2008 | Navon |
| 2008/0255912 A1* | 10/2008 | Christiansen .......... G06Q 10/00 705/7.12 |
| 2008/0295096 A1 | 11/2008 | Beaty et al. |
| 2008/0312979 A1 | 12/2008 | Lee et al. |
| 2008/0319811 A1 | 12/2008 | Casey |
| 2009/0012986 A1 | 1/2009 | Arazi et al. |
| 2009/0013325 A1 | 1/2009 | Kobayashi et al. |
| 2009/0018880 A1 | 1/2009 | Bailey et al. |
| 2009/0063251 A1 | 3/2009 | Rangarajan et al. |
| 2009/0063540 A1* | 3/2009 | Mattox ............. G06F 17/30017 |
| 2009/0100017 A1 | 4/2009 | Graves et al. |
| 2009/0100406 A1 | 4/2009 | Greenfield et al. |
| 2009/0144120 A1 | 6/2009 | Ramachandran |
| 2009/0150396 A1 | 6/2009 | Elisha et al. |
| 2009/0195350 A1 | 8/2009 | Tsern et al. |
| 2009/0198535 A1 | 8/2009 | Brown et al. |
| 2009/0199192 A1* | 8/2009 | Laithwaite ............ G06Q 10/06 718/104 |
| 2009/0216580 A1 | 8/2009 | Bailey et al. |
| 2009/0234892 A1 | 9/2009 | Anglin et al. |
| 2009/0300173 A1 | 12/2009 | Bakman et al. |
| 2009/0319316 A1 | 12/2009 | Westerfeld et al. |
| 2010/0005014 A1 | 1/2010 | Castle et al. |
| 2010/0005173 A1 | 1/2010 | Baskaran et al. |
| 2010/0017344 A1 | 1/2010 | Hambrecht et al. |
| 2010/0042455 A1 | 2/2010 | Liu et al. |
| 2010/0049494 A1 | 2/2010 | Radibratovic et al. |
| 2010/0082380 A1 | 4/2010 | Merrifield, Jr. et al. |
| 2010/0094740 A1 | 4/2010 | Richter |
| 2010/0125473 A1 | 5/2010 | Tung et al. |
| 2010/0153282 A1 | 6/2010 | Graham |
| 2010/0161371 A1* | 6/2010 | Cantor .................. G06Q 10/06 705/7.11 |
| 2010/0169477 A1 | 7/2010 | Stienhans et al. |
| 2010/0185557 A1 | 7/2010 | Hunter et al. |
| 2010/0198750 A1 | 8/2010 | Ron et al. |
| 2010/0211667 A1 | 8/2010 | O'Connell, Jr. |
| 2010/0250419 A1 | 9/2010 | Ariff et al. |
| 2010/0250421 A1 | 9/2010 | Ariff et al. |
| 2010/0250642 A1 | 9/2010 | Yellin et al. |
| 2010/0293163 A1* | 11/2010 | McLachlan ............. G06N 5/04 707/736 |
| 2010/0299233 A1 | 11/2010 | Licardi et al. |
| 2010/0306382 A1 | 12/2010 | Cardosa et al. |
| 2010/0323754 A1 | 12/2010 | Nakagawa |
| 2010/0325506 A1 | 12/2010 | Cai et al. |
| 2010/0325606 A1 | 12/2010 | Sundararajan et al. |
| 2010/0332262 A1 | 12/2010 | Horvitz et al. |
| 2010/0333109 A1 | 12/2010 | Milnor |
| 2011/0016214 A1 | 1/2011 | Jackson |
| 2011/0016448 A1 | 1/2011 | Bauder et al. |
| 2011/0022861 A1 | 1/2011 | Agneeswaran et al. |
| 2011/0066472 A1 | 3/2011 | Scheider |
| 2011/0066628 A1 | 3/2011 | Jayaraman |
| 2011/0072340 A1 | 3/2011 | Miller |
| 2011/0106691 A1 | 5/2011 | Clark et al. |
| 2011/0107254 A1 | 5/2011 | Moroze |
| 2011/0167034 A1* | 7/2011 | Knight ............ G06F 17/30312 707/602 |
| 2011/0196795 A1 | 8/2011 | Pointer |
| 2011/0225277 A1 | 9/2011 | Freimuth et al. |
| 2011/0295766 A1 | 12/2011 | Tompkins |
| 2011/0313947 A1 | 12/2011 | Grohovaz |
| 2012/0016811 A1 | 1/2012 | Jones |
| 2012/0023170 A1 | 1/2012 | Matignon et al. |
| 2012/0066020 A1 | 3/2012 | Moon et al. |
| 2012/0116990 A1 | 5/2012 | Huang |
| 2012/0131591 A1 | 5/2012 | Moorthi et al. |

(56) References Cited

U.S. PATENT DOCUMENTS

| | | | |
|---|---|---|---|
| 2012/0150736 | A1 | 6/2012 | Dickerson et al. |
| 2012/0185368 | A1 | 7/2012 | Schloter et al. |
| 2012/0232947 | A1 | 9/2012 | McLachlan et al. |
| 2012/0233217 | A1 | 9/2012 | Purpus et al. |
| 2012/0233547 | A1 | 9/2012 | McLachlan |
| 2012/0239739 | A1 | 9/2012 | Manglik et al. |
| 2012/0246046 | A1 | 9/2012 | Hirsch |
| 2012/0272234 | A1 | 10/2012 | Kaiser et al. |
| 2012/0330869 | A1 | 12/2012 | Durham |
| 2013/0028537 | A1 | 1/2013 | Miyake et al. |
| 2013/0041819 | A1 | 2/2013 | Khasho |
| 2013/0060595 | A1 | 3/2013 | Bailey |
| 2013/0066866 | A1 | 3/2013 | Chan et al. |
| 2013/0091456 | A1* | 4/2013 | Sherman .............. G06Q 10/06 715/778 |
| 2013/0091465 | A1 | 4/2013 | Kikin-Gil et al. |
| 2013/0103654 | A1 | 4/2013 | McLachlan et al. |
| 2013/0124454 | A1 | 5/2013 | Bhide et al. |
| 2013/0124459 | A1* | 5/2013 | Iwase ................. G06F 19/321 707/608 |
| 2013/0138470 | A1 | 5/2013 | Goyal et al. |
| 2013/0173159 | A1 | 7/2013 | Trum et al. |
| 2013/0179371 | A1 | 7/2013 | Jain et al. |
| 2013/0201193 | A1* | 8/2013 | McLachlan ........... G06Q 40/00 345/441 |
| 2013/0227584 | A1 | 8/2013 | Greene et al. |
| 2013/0268307 | A1 | 10/2013 | Li et al. |
| 2013/0282537 | A1 | 10/2013 | Snider |
| 2013/0293551 | A1* | 11/2013 | Erez .................... G06T 11/206 345/440 |
| 2013/0339274 | A1 | 12/2013 | Willis et al. |
| 2013/0346390 | A1 | 12/2013 | Jerzak et al. |
| 2014/0006085 | A1* | 1/2014 | McLachlan ........... G06Q 40/00 705/7.23 |
| 2014/0006222 | A1 | 1/2014 | Hericks et al. |
| 2014/0067632 | A1 | 3/2014 | Curtis |
| 2014/0075004 | A1 | 3/2014 | Van Dusen et al. |
| 2014/0089509 | A1 | 3/2014 | Akolkar et al. |
| 2014/0122374 | A1 | 5/2014 | Hacigumus et al. |
| 2014/0129583 | A1* | 5/2014 | Munkes ............ G06F 17/30967 707/760 |
| 2014/0136295 | A1 | 5/2014 | Wasser |
| 2014/0143175 | A1 | 5/2014 | Greenshields et al. |
| 2014/0172918 | A1* | 6/2014 | Kornmann .......... G06F 21/6218 707/785 |
| 2014/0229212 | A1* | 8/2014 | MacElheron .......... G06Q 10/06 705/7.15 |
| 2014/0244364 | A1 | 8/2014 | Evers |
| 2014/0252095 | A1 | 9/2014 | Kikin |
| 2014/0257928 | A1 | 9/2014 | Chen et al. |
| 2014/0278459 | A1 | 9/2014 | Morris |
| 2014/0279121 | A1 | 9/2014 | George et al. |
| 2014/0279201 | A1 | 9/2014 | Iyoob et al. |
| 2014/0279676 | A1 | 9/2014 | Schafer et al. |
| 2014/0288987 | A1* | 9/2014 | Liu ..................... G06Q 10/06 705/7.15 |
| 2014/0351166 | A1 | 11/2014 | Schlossberg |
| 2014/0365503 | A1* | 12/2014 | Franceschini ..... G06F 17/30958 707/748 |
| 2014/0365504 | A1* | 12/2014 | Franceschini ..... G06F 17/30958 707/748 |
| 2015/0006552 | A1 | 1/2015 | Lord |
| 2015/0012328 | A1* | 1/2015 | McLachlan ...... G06Q 10/06315 705/7.25 |
| 2015/0066808 | A1 | 3/2015 | Legare et al. |
| 2015/0074075 | A1* | 3/2015 | Alexander ............ G06Q 10/10 707/706 |
| 2015/0088584 | A1 | 3/2015 | Santiago III et al. |
| 2015/0294273 | A1 | 10/2015 | Barraci et al. |
| 2015/0302303 | A1 | 10/2015 | Hakim |
| 2015/0341230 | A1* | 11/2015 | Dave .................. H04L 41/5058 705/7.29 |
| 2017/0102246 | A1 | 4/2017 | Yang |
| 2018/0068246 | A1* | 3/2018 | Crivat .............. G06Q 10/06313 |

OTHER PUBLICATIONS

"Activity Based Costing is the best allocation methodology," APPTIO, Community for Technology Business Management, Mar. 16, 2010, 2 pages.

"Amazon Elastic Computer Cloud (Amazon EC2)", archive.org, Oct. 21, 2011, 9 pages http://web.archive.org/web/20111029130914/http://aws.amazon.com/ec2/#pricing.

"Apptio Extends Leadership in Cloud Business Management with Launch of Apptio Cloud Express," Apptio, Dec. 12, 2012, 2 pages http://www.apptio.com/news/apptio-extends-leadership-cloud-business-management-launch-apptio-cloud-express#, Ukm4r8X7Lco.

"Apptio Optimizes Enterprise IT Costs Utilizing Amazon Web Services Cloud Computing," Apptio, Apr. 7, 2009, 2 pages http://www.apptio.com/news/apptio-optimizes-enterprise-it-costs-utilizing-amazon-web-services-cloud-cornputing#, Ukm5XsX7Lco.

"Automating Cost Transparency," Apptio, 2008, 15 pages htto://www.cio.com/documents/whitepapers/AutomatedCostTransparency.pdf.

"Cloud Computing and Sustainability: The Environmental Benefits of Moving to the Cloud," Accenture, archive.org, Aug. 31, 2011, 17 pages http://web.archive.org/web/20110813022626/http://www.accenture.com/SiteCollectionDocuments/PDF/Accenture_Sustainability_Cloud_Computing_TheEnvironmentalBenefitsofMovingtotheCloud.pdf.

"IT Cost Transparency and Apptio," Dec. 4, 2008, 2 pages http://web.archive.org/web/20081204012158/http://www.apptio.com/solutions.

"Notice from the European Patent Office dated Oct. 1, 2007 concerning business methods," Official Journal EPO, Nov. 2007, pp. 592-593.

"Program Evaluation and Review Technique," Wikipedia, the free encyclopedia, accessed Mar. 13, 2012, 10 pages http://en.wikipedia.org/wiki/Program_Evaluation_and_Review_Technique—as modified Mar. 12, 2012.

"Project Management," Wkipedia, the free encyclopedia, accessed Mar. 13, 2012, 14 pages http://en.wikipedia.org/wiki/Project_management—last modified Mar. 7, 2012.

"Visualization for Production Management: Treemap and Fisheye Table Browser," Open-Video Organization webpages, 2001, 2 pages http://www.open-video.org/details.php?videoid=4547.

Busch, J., "Six Strategies for IT Cost Allocation," Spend Matters, Jan. 5, 2011, 3 pages http://spendmatters.com/2011/01/05/six-strategies-for-it-cost-allocation/.

Morgan, T. P., "Apptio puffs up freebie cost control freak for public clouds," The Register, Dec. 12, 2012, 2 pages http://www.theregister.co.uk/2012/12/12/apptio_cloud_express.

Ricknäs, M., "Apptio unveils tool to keep track of cloud costs," ComputerWorld, Dec. 12, 2012, 1 page http://www.computerworld.com/s/article/9234630/Apptio_unveils_tool_to_keep_track_of_cloud_costs.

Talbot, C., "Apptio Cloud Express Provides Free Usage Tracking Service," talkincloud.com, Dec. 12, 2012, 4 pages http://talkincloud.com/cloud-computing-management/apptio-cloud-express-provides-free-usage-tracking-service.

Vizard, M., "Free Service from Apptio Tracks Cloud Service Provider Pricing," IT Business Edge, Dec. 12, 2012, 6 pages http://www.itbusinessedge.com/blog/it-unmasked/free-service-from-apptio-tracks-cloud-service-provider-pricing.html.

International Search Report and Written Opinion for International Patent Application No. PCT/US2010/035021 dated Jul. 14, 2010, 12 pages.

International Preliminary Report on Patentability for International Patent Application No. PCT/US2010/035021 dated Nov. 24, 2011, 10 pages.

International Search Report and Written Opinion for International Patent Application No. PCT/US2012/028353 dated Oct. 31, 2012, 9 pages.

International Preliminary Report on Patentability for International Patent Application No. PCT/US2012/028353 dated Sep. 19, 2013, 6 pages.

(56) References Cited

OTHER PUBLICATIONS

International Search Report and Written Opinion for International Patent Application No. PCT/US2012/028378 dated Sep. 12, 2012, 11 pages.
International Preliminary Report on Patentability for International Patent Application No. PCT/US2012/028378 dated Sep. 19, 2013, 7 pages.
Extended European Search Report in EP Application No. 13151967.0-1955, dated Apr. 19, 2013, 8 pages.
Official Communication for U.S. Appl. No. 12/467,120 dated Oct. 4, 2011, 12 pages.
Official Communication for U.S. Appl. No. 12/467,120 dated Jun. 20, 2012, 17 pages.
Official Communication for U.S. Appl. No. 12/467,120 dated Aug. 29, 2012, 3 pages.
Official Communication for U.S. Appl. No. 12/467,120 dated Oct. 23, 2013, 21 pages.
Official Communication for U.S. Appl. No. 12/467,120 dated Mar. 26, 2013, 18 pages.
Official Communication for U.S. Appl. No. 13/324,253 dated Sep. 25, 2012, 17 pages.
Official Communication for U.S. Appl. No. 13/324,253 dated Jan. 10, 2013, 20 pages.
Official Communication for U.S. Appl. No. 13/324,253 dated Mar. 19, 2013, 3 pages.
Official Communication for U.S. Appl. No. 13/324,253 dated Sep. 6, 2013, 21 pages.
Official Communication for U.S. Appl. No. 13/415,797 dated Oct. 3, 2013, 17 pages.
Official Communication for U.S. Appl. No. 13/452,628 dated Apr. 22, 2013, 11 pages.
Official Communication for U.S. Appl. No. 13/675,837 dated Oct. 10, 2013, 41 pages.
Official Communication for U.S. Appl. No. 13/837,815 dated Oct. 23, 2013, 9 pages.
Official Communication for U.S. Appl. No. 13/917,478 dated Nov. 7, 2013, 15 pages.
Official Communication for U.S. Appl. No. 13/917,503 dated Oct. 10, 2013, 41 pages.
Official Communication for U.S. Appl. No. 13/935,147 dated Oct. 22, 2013, 16 pages.
Office Communication for U.S. Appl. No. 13/649,019 dated Sep. 23, 2015, 15 pages.
Office Communication for U.S. Appl. No. 13/365,150 dated Sep. 24, 2015, 15 pages.
Office Communication for U.S. Appl. No. 14/033,130 dated Sep. 15, 2015, 22 pages.
Official Communication for U.S. Appl. No. 13/452,628 dated Jan. 12, 2016, 21 pages.
Official Communication for U.S. Appl. No. 13/649,019 dated Jan. 4, 2016, 8 pages.
European Examination Report for Application No. 14159413.5 dated Jul. 15, 2015, 9 pages.
Office Communication for U.S. Appl. No. 13/415,701 dated Oct. 27, 2015, 16 pages.
Official Communication for U.S. Appl. No. 14/869,721 dated Jan. 13, 2016, 57 pages.
Office Communication for U.S. Appl. No. 13/675,837 dated Oct. 26, 2015, 20 pages.
Office Communication for U.S. Appl. No. 13/917,503 dated Oct. 22, 2015, 19 pages.
Office Communication for U.S. Appl. No. 14/722,663 dated Dec. 1, 2015, 37 pages.
Official Communication for U.S. Appl. No. 13/452,628 dated Nov. 18, 2013, 15 pages.
Official Communication for U.S. Appl. No. 14/033,130 dated Dec. 16, 2013, 15 pages.
Official Communication for U.S. Appl. No. 13/324,253 dated Jan. 23, 2014, 15 pages.
Official Communication for U.S. Appl. No. 13/675,837 dated Jan. 31, 2014, 37 pages.
Official Communication for U.S. Appl. No. 13/917,503 dated Jan. 31, 2014, 25 pages.
Robinson Glen, Cloud Economics—Cost Optimization (selected slides), Amazon Web Services AWS, Slideshare, Feb. 28, 2012 http://www.slideshare.net/AmazonWebServices/whats-new-with-aws-london.
Skilton et al, Building Return on Investment from Cloud Computing, The open Group Whitepaper, mladina webpages, Apr. 2010 http://www.mladina.si/media/objave/dokumenti/2010/5/31/31_5_2010_open_group_building_return-on-investment-from-cloud-computing.pdf.
Ward Miles, Optimizing for Cost in the Cloud (selection), AWS Summit, Slideshare Apr. 2012 http://www.slideshare.net/AmazonWebServices/optirnizing-your-infrastructure-costs-on-aws.
Amazon Reserved Instances, Amazon Web Services, archives org, Jan. 14, 2013 http://web.archive.org/web/2012011453849/http://aws.amazon.com/rds/reserved-instances/?.
Cost Optimisation with Amazon Web Services, extracted slides, Slideshare Jan. 30, 2012 http://www.slideshare.net/AmazonWebServices/cost-optimisation-with-amazon-web-services?from_search=1.
Deciding an Approach to the cloud AWS Reserved Instances, Cloudyn webpages, Feb. 28, 2012 https://www.cloudyn.com/blog/deciding-an-approach-to-the-cloud-aws-reserved-aws.
Ganesan Harish, Auto Scaling using AWS, Amazon Web Services AWS (selected slides), Apr. 20 2011 http://www.slideshare.net/harishganesan/auto-scaling-using-amazon-web-services-aws.
Office Communication for U.S. Appl. No. 13/415,797 dated Apr. 9, 2014, 18 pages.
Office Communication for U.S. Appl. No. 13/324,253 dated Apr. 9, 2014, 3 pages.
Office Communication for U.S. Appl. No. 13/324,253 dated Oct. 24, 2014, 26 pages.
Office Communication for U.S. Appl. No. 13/365,150 dated Dec. 3, 2014, 16 pages.
Office Communication for U.S. Appl. No. 13/452,628 dated Oct. 1, 2014, 14 pages.
Office Communication for U.S. Appl. No. 13/837,815 dated Apr. 7, 2014, 14 pages.
Office Communication for U.S. Appl. No, 13/365,150 dated Dec. 7, 2015, 3 pages.
Office Communication for U.S. Appl. No. 13/675,837 dated Apr. 2, 2014, 3 pages.
Office Communication for U.S. Appl. No. 13/917,503 dated Apr. 3, 2014, 3 pages.
Office Communication for U.S. Appl. No. 13/935,147 dated Apr. 11, 2014, 22 pages.
Office Communication for U.S. Appl. No. 13/935,147 dated Jun. 16, 2014, 3 pages.
Office Communication for U.S. Appl. No. 14/033,130 dated May 27, 2014, 22 pages.
Office Communication for U.S. Appl. No. 14/033,130 dated Aug. 5, 2014, 3 pages.
Office Communication for U.S. Appl. No. 14/180,308 dated Jan. 30, 2015, 21 pages.
Office Communication for U.S. Appl. No. 14/180,308 dated Apr. 8, 2014, 16 pages.
Office Communication for U.S. Appl. No. 13/452,628 dated Mar. 13, 2014, 15 pages.
SAS Activity-Based Management, 2010, Fact Sheet, 4 pages.
Office Communication for U.S. Appl. No. 14/180,308 dated Sep. 2, 2014, 19 pages.
Office Communication for U.S. Appl. No. 14/180,308 dated Apr. 17, 2015, 5 pages.
Extended European Search Report in EP Application No. 14159413.5 dated Jul. 4, 2014, 11 pages.
Office Communication for U.S. Appl. No. 13/415,797 dated Jan. 12, 2015, 20 pages.
Office Communication for U.S. Appl. No. 13/837,815 dated Sep. 25, 2014, 16 pages.
Office Communication for U.S. Appl. No. 13/324,253 dated Feb. 19, 2015, 22 pages.

(56) References Cited

OTHER PUBLICATIONS

Henriet et al. "Traffic-Based Cost Allocation in a Network." The Rand Journal of Economics, 1996, pp. 332-345.
Rudnick et al "Marginal Pricing and Supplement Cost Allocation in Transmission Open Access." Power Systems, IEEE Transactions on 10.2, 1995, pp. 1125-1132.
Office Communication for U.S. Appl. No, 13/949,019 dated Feb. 10, 2015, 14 pages.
European Search Report for Application No. 12755613.2 dated Jan. 26, 2015, 6 pages.
Office Communication for U.S. Appl. No. 13/452,628 dated Mar. 30, 2015, 18 pages.
Office Communication for U.S. Appl. No. 13/917,503 dated Apr. 16, 2015, 19 pages.
Office Communication for U.S. Appl. No. 13/675,837 dated Apr. 16, 2015, 19 pages.
Office Communication for U.S. Appl. No. 13/837,815 dated Apr. 27, 2015, 18 pages.
Office Communication for U.S. Appl. No. 13/452,628 dated Jun. 23, 2015, 3 pages.
Office Communication for U.S. Appl. No. 13/415,797 dated Jul. 23, 2015, 22 pages.
International Search Report and Written Opinion for PCT/US2015/015486 dated Jun. 29, 2015, 13 pages.
Office Communication for U.S. Appl. No. 13/935,147 dated Jul. 9, 2015, 6 pages.
Official Communication for U.S. Appl. No. 13/415,797 dated Oct. 19, 2015, 3 pages.
Official Communication for U.S. Appl. No. 13/837,815 dated Sep. 28, 2015, 20 pages.
Chien-Liana Fok et al,, "Rapid Development and Flexible Deployment of Adaptive Wireless Sensor Network Applications," Proceedings of the 25th IEEE International Conference on Distributed Computing Systems, 2005, pp. 653-662 (10 pages).
Frans Flippo et al., "A Framework for Rapid Development of Multimodal Interfaces," Proceedings of the 5th International Conference on Multimodal Interfaces, 2003, pp. 109-116 (8 pages).
David B. Stewart et al., "Rapid Development of Robotic Applications Using Component-Based Real-Time Software," Intelligent Robots arid Systems 1995, Human Robot Interaction and Cooperative Robots Proceedings, 1995, IEEE International Conference on vol. 1, pp. 465-470 (6 pages).
Office Communication for U.S. Appl. No. 14/846,349 dated Dec. 17, 2015, 23 pages.
International Search Report and Written Opinion for PCT/US2015/048697 dated Mar. 31, 2016, 9 pages.
Office Communication for U.S. Appl. No. 13/365,150, dated Apr. 6, 2016, 11 pages.
Office Communication for U.S. Appl. No. 14/722,663, dated Mar. 31, 2016, 5 pages.
Van Diessen et al., "Component Business Model for Digital Repositories: A Framework for Analysis," AAAI, 2008, 7 pages.
Melcher et al., "Visualization and Clustering of Business Process Collections Based on Process Metric Values," IEEE Computer Society, 2008, 4 pages.
Lee et al., "Value-Centric, Model-Driven Business Transformation," IEEE, 2008, 8 pages.
Lee et al., "Business Transformation Workbench: A Practitioner's Tool for Business Transformation," IEEE International Conference on Services Computing, 2008, 8 pages.
Risch et al., "Interactive Information Visualization for Exploratory Intelligence Data Analysis," IEEE Proceedings of VRAIS, 1996, 10 pages.
Office Communication for U.S. Appl. No. 13/415,797, dated Apr. 4, 2016, 24 pages.
Office Communication for U.S. Appl. No. 13/837,815, dated Apr. 13, 2016, 22 pages.
Official Communication for U.S. Appl. No. 14/869,721 dated Aug. 3, 2016, 5 pages.
Official Communication for U.S. Appl. No. 13/452,628 dated Aug. 18, 2016, 22 pages.
Official Communication for U.S. Appl. No. 13/935,147 dated Mar. 9, 2016, 10 pages.
Official Communication for U.S. Appl. No. 14/033,130 dated Feb. 18, 2016, 22 pages.
Official Communication for U.S. Appl. No. 14/867,552 dated Oct. 3, 2016, 19 pages.
Office Communication for U.S. Appl. No. 13/837,815 dated Jun. 23, 2016, 3 pages.
Office Communication for U.S. Appl. No. 14/033,130 dated Apr. 25, 2016, 4 pages.
Office Communication for U.S. Appl. No. 14/846,349 dated Jul. 1, 2016, 24 pages.
Office Communication for U.S. Appl. No. 14/869,721 dated Jun. 1, 2016, 35 pages.
Office Communication for U.S. Appl. No. 14/971,944 dated May 19, 2016, 17 pages.
Office Communication for U.S. Appl. No. 14/977,368 dated Jun. 7, 2016, 11 pages.
Office Communication for U.S. Appl. No. 14/981,747 dated Jul. 14, 2016, 29 pages.
Official Communication for U.S. Appl. No. 14/180,308 dated Oct. 19, 2016, 22 pages.
Official Communication for U.S. Appl. No. 14/977,368 dated Oct. 19, 2016, 5 pages.
Official Communication for U.S. Appl. No. 13/365,150 dated Oct. 24, 2016, 19 pages.
Official Communication for U.S. Appl. No. 13/837,815 dated Nov. 9, 2016, 11 pages.
Official Communication for U.S. Appl. No. 15/260,221 dated Dec. 20, 2016, 21 pages.
Official Communication for U.S. Appl. No. 15/271,013 dated Dec. 15, 2016, 50 pages.
Official Communication for U.S. Appl. No. 13/415,797 dated Jan. 11, 2017, 25 pages.
Official Communication for U.S. Appl. No. 13/675,837 dated Jan. 11, 2017, 29 pages.
Efficient frontier—Wikipedia, Efficient frontier, Wikipedia webpages, Oct. 30, 2016, https://en.wikipedia.org/wiki/Efficient_frontier, 2 pages.
Official Communication for U.S. Appl. No. 13/917,503 dated Jan. 12, 2017, 27 pages.
Official Communication for U.S. Appl. No. 14/033,130 dated Jan. 11, 2017, 12 pages.
Official Communication for U.S. Appl. No. 14/867,552 dated Jan. 9, 2017, 3 pages.
Official Communication for U.S. Appl. No. 14/180,308 dated Feb. 8, 2017, 3 pages.
Official Communication for U.S. Appl. No. 14/846,349 dated Mar. 1, 2017, 27 pages.
Official Communication for U.S. Appl. No. 13/935,147 dated Mar. 7, 2017, 12 pages.
Official Communication for U.S. Appl. No. 13/365,150 dated Mar. 15, 2017, 19 pages.
Official Communication for U.S. Appl. No. 13/452,628 dated Mar. 9, 2017, 24 pages.
Official Communication for U.S. Appl. No. 15/379,267 dated Mar. 10, 2017, 11 pages.
Official Communication for U.S. Appl. No. 14/981,747 dated May 19, 2017, 43 pages.
Official Communication for U.S. Appl. No. 15/271,013 dated May 24, 2017, 37 pages.
Official Communication for U.S. Appl. No. 13/365,150 dated May 22, 2017, 3 pages.
Official Communication for U.S. Appl. No. 13/917,503 dated May 16, 2017, 29 pages.
Official Communication for U.S. Appl. No. 14/869,721 dated May 5, 2017, 49 pages.
Official Communication for U.S. Appl. No. 14/180,308 dated May 25, 2017, 21 pages.
Official Communication for U.S. Appl. No. 15/379,267 dated Jun. 30, 2017, 16 pages.

(56) References Cited

OTHER PUBLICATIONS

Official Communication for U.S. Appl. No. 14/867,552 dated Jun. 29, 2017, 31 pages.
Official Communication for U.S. Appl. No. 14/033,130 dated Jun. 29, 2017, 18 pages.
Official Communication for U.S. Appl. No. 13/837,815 dated Jun. 12, 2017, 12 pages.
Official Communication for U.S. Appl. No. 13/365,150 dated Aug. 23, 2017, 30 pages.
Official Communication for U.S. Appl. No. 15/260,221 dated Aug. 15, 2017, 21 pages.
Official Communication for European Application No. 13151967.0 dated Aug. 18, 2017, 7 pages.
European Search Report for European Application No. 10775648.8 dated Mar. 10, 2017, 6 pages.
Official Communication for European Application No. 12755613.2 dated Aug. 17, 2017, 7 pages.
Official Communication for U.S. Appl. No. 14/033,130 dated Sep. 7, 2017, 3 pages.
Official Communication for U.S. Appl. No. 14/846,349 dated Sep. 8, 2017, 25 pages.
Official Communication for U.S. Appl. No. 13/452,628 dated Sep. 28, 2017, 26 pages.
Official Communication for U.S. Appl. No. 13/837,815 dated Sep. 28, 2017, 9 pages.
Official Communication for U.S. Appl. No. 13/415,797 dated Sep. 7, 2017, 26 pages.
Official Communication for U.S. Appl. No. 14/846,349 dated Nov. 20, 2017, 3 pages.
Official Communication for U.S. Appl. No. 13/917,503 dated Nov. 28, 2017, 26 pages.
Official Communication for U.S. Appl. No. 13/935,147 dated Nov. 3, 2017, 11 pages.
Official Communication for U.S. Appl. No. 14/869,721 dated Oct. 17, 2017, 30 pages.
Official Communication for U.S. Appl. No. 15/379,267 dated Oct. 6, 2017, 3 pages.
Official Communication for U.S. Appl. No. 14/867,552 dated Nov. 29, 2017, 12 pages.
Official Communication for U.S. Appl. No. 14/981,747 dated Dec. 12, 2017, 44 pages.
Official Communication for U.S. Appl. No. 14/033,130 dated Dec. 20, 2017, 12 pages.
Official Communication for U.S. Appl. No. 14/180,308 dated Dec. 22, 2017, 18 pages.
Official Communication for U.S. Appl. No. 15/271,013 dated Dec. 27, 2017, 35 pages.
Official Communication for U.S. Appl. No. 15/260,221 dated Jan. 9, 2018, 21 pages.
Official Communication for U.S. Appl. No. 15/379,267 dated Jan. 2, 2018, 15 pages.
Official Communication for U.S. Appl. No. 15/351,313 dated Jan. 8, 2018, 11 pages.
Official Communication for U.S. Appl. No. 15/351,313 dated Jul. 18, 2017, 15 pages.
Official Communication for U.S. Appl. No. 15/351,313 dated Jan. 12, 2017, 7 pages.
Official Communication for U.S. Appl. No. 13/837,815 dated Jan. 26, 2018, 12 pages.
Official Communication for U.S. Appl. No. 13/935,147 dated Jan. 17, 2018, 3 pages.
Official Communication for U.S. Appl. No. 14/869,721 dated Jan. 19, 2018, 3 pages.
Official Communication for U.S. Appl. No. 14/867,552 dated Feb. 13, 2018, 3 pages.
Official Communication for U.S. Appl. No. 14/846,349 dated Jan. 18, 2018, 29 pages.
Official Communication for U.S. Appl. No. 13/917,503 dated Jul. 19, 2018, pp. 1-3.
Official Communication for U.S. Appl. No. 14/846,349 dated Jul. 20, 2018, pp. 1-40.
Official Communication for U.S. Appl. No. 14/981,747 dated Jul. 5, 2018, pp. 1-62.
Official Communication for U.S. Appl. No. 15/271,013 dated Jul. 6, 2018, pp. 1-49.
Official Communication for U.S. Appl. No. 15/379,267 dated Jul. 19, 2018, pp. 1-34.
Official Communication for U.S. Appl. No. 15/859,008 dated Mar. 5, 2018, 20 pages.
Official Communication for U.S. Appl. No. 13/917,503 dated May 10, 2018, pp. 1-38.
Official Communication for U.S. Appl. No. 13/837,815 dated Apr. 5, 2018, pp. 1-4.
Official Communication for U.S. Appl. No. 14/869,721 dated May 11, 2018, pp. 1-33.
Official Communication for U.S. Appl. No. 15/351,313 dated Jun. 4, 2018, pp. 1-9.
Official Communication for U.S. Appl. No. 15/859,058 dated May 14, 2018, pp. 1-76.
Official Communication for U.S. Appl. No. 13/935,147 dated Apr. 5, 2018, pp. 1-14.
Official Communication for U.S. Appl. No. 14/867,552 dated May 31, 2018, pp. 1-22.
Official Communication for U.S. Appl. No. 14/033,130 dated Aug. 9, 2018, pp. 1-47.
Official Communication for U.S. Appl. No. 14/180,308 dated Aug. 6, 2018, pp. 1-23.
Official Communication for U.S. Appl. No. 15/858,008 dated Jul. 31, 2018, pp. 1-28.
Official Communication for U.S. Appl. No. 13/917,503 dated Nov. 20, 2018, pp. 1-55.
Official Communication for U.S. Appl. No. 14/869,721 dated Oct. 11, 2018, pp. 1-73.
Official Communication for U.S. Appl. No. 14/867,552 dated Nov. 21, 2018, pp. 1-37.
Official Communication for U.S. Appl. No. 15/260,221 dated Oct. 5, 2018, pp. 1-40.
Official Communication for U.S. Appl. No. 15/379,267 dated Oct. 18, 2018, pp. 1-9.
Official Communication for U.S. Appl. No. 15/859,058 dated Dec. 5, 2018, pp. 1-20.
Official Communication for U.S. Appl. No. 14/033,130 dated Dec. 18, 2018, pp. 1-11.
Official Communication for U.S. Appl. No. 15/271,013 dated Dec. 18, 2018, pp. 1-47.

\* cited by examiner

```
"description": "Server Report",
"elements": [
    {
        "Servers": {
            "focus1":    {"object":"Engineering.Servers", "R":100},
            "focus2_1":  {"object":"Engineering.DevOps.Servers", "I":100},
            "focus2+2":  {"object":"Engineering.Development.Servers", "R":100},
            "group1_1":  "Engineering.Servers.Servers.OS",
            "group2_1":  "Engineering.Servers.Servers.Location",
            "group1_2":  "Engineering.Development.Servers.OS",
            "group2_2":  "Engineering.Development.Servers.Location",
            "group1_3":  "Engineering.Devops.Servers.OS",
            "group2_3":  "Engineering.Devops.Servers.Location"
        }
    },
    ...
]
```

902 → focus1
904 → focus2_1
906 → focus2+2

REPORT GENERATION BASED ON USER RESPONSIBILITY

TECHNICAL FIELD

The present invention relates generally to computer automated resource allocation modeling, and more particularly, but not exclusively to providing reports based on data models.

BACKGROUND

Businesses that strive to remain viable and successful in today's competitive commercial environment are required to adopt accurate and responsive resource allocation and resource budgeting practices. To improve efficiency, businesses may use models that apply modern budgeting, forecasting and resource accounting techniques. For some resource allocation techniques, the complexity of the underlying data models may increase as the number of tracked activities and elements increases. Therefore, for larger enterprises, sophisticated computer programs and computers are often required to assist in generating useful and relevant resource models for analyzing resource allocations. In some cases, the large number of items and entities required for enterprise scale resource modeling may make it difficult for some users to interpret the models In some cases the complexity of the models and the modelled items and entities may make it difficult to compare or report on allocations in large enterprises. Thus, it is with respect to these considerations and others that the invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. For a better understanding of the present invention, reference will be made to the following Detailed Description of the Various Embodiments, which is to be read in association with the accompanying drawings, wherein:

FIG. 9 illustrates a portion of a report template for generating reports in accordance with one or more of the various embodiments;

DETAILED DESCRIPTION OF THE VARIOUS EMBODIMENTS

Figure 1:
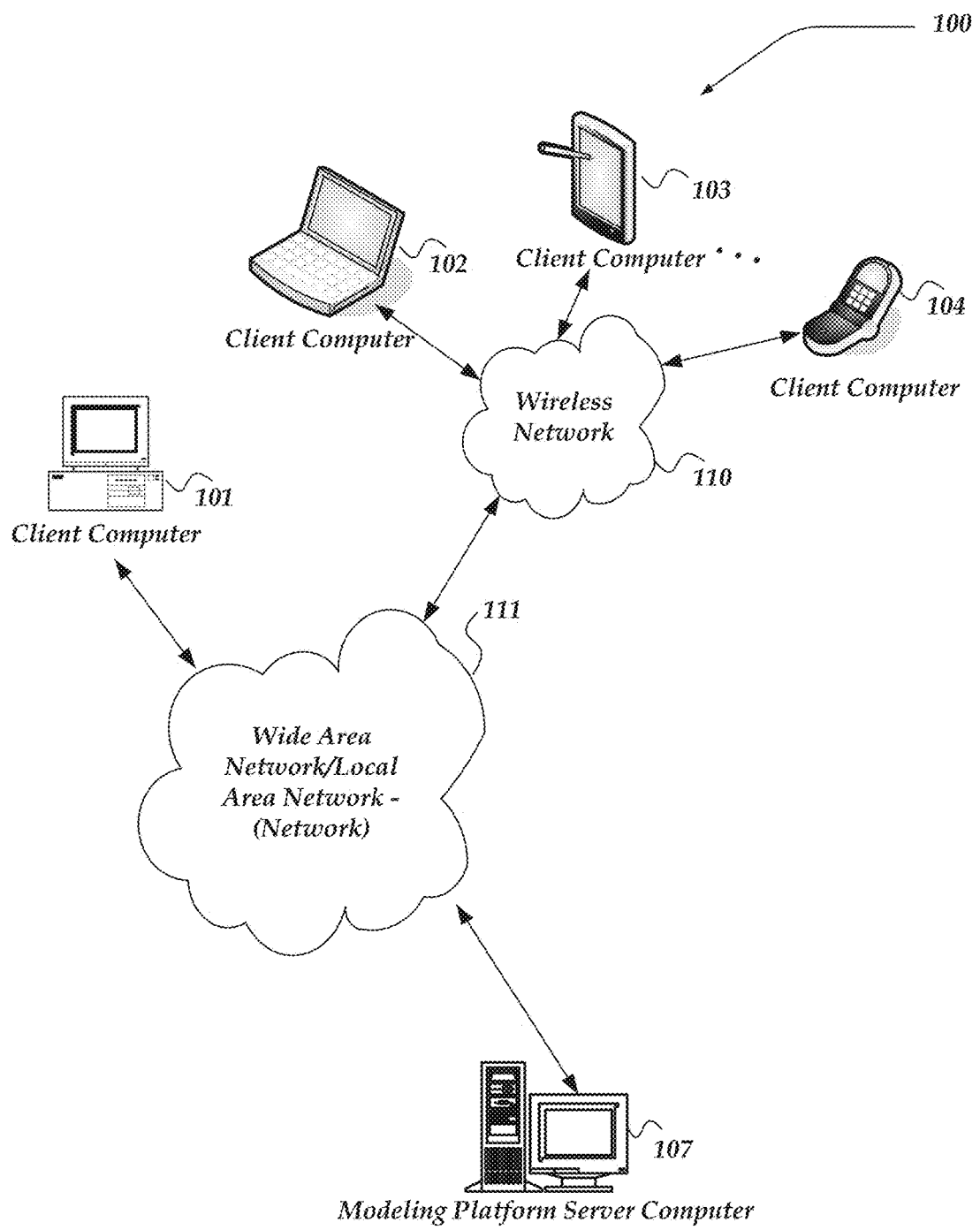
FIG. 1 illustrates a system diagram showing components of an environment in which at least one of the various embodiments may be practiced.

The present innovations now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "In one of the embodiments" or "in one or more of the various embodiments" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "resource allocation model," and "data model" refer to a graph based representation of a system of resource allocation rules that may be used for tracking/analyzing resource allocation, resource consumption, resource budgeting, or the like. Nodes in the model may represent groups of items or objects that may be associated with resources or resource allocations. The edges of the graph may represent how resources may be allocated between the nodes (objects). A financial allocation model may be a visual rendering of a graph showing the nodes and the edges connecting the nodes.

As used herein, the term "model line item," refers to a single line item in a data model and its associated characteristics, including resources, costs, description, or the like. For example, the costs associated with a particular computer that is an email server may be represented by a single model line item having a particular cost (e.g., the email server may correspond to a model line item).

As used herein, the term "data model," or "model object" refers to a set or class of model line items that may be grouped together. Also, dataset information may be mapped to one or more categories by a modeling engine. For example, a collection of computers performing services such as email, web serving, enterprise resource planning, may represent separate model line items and they may be grouped into the Servers category or Servers Object. Nodes in the data model graph may be considered to represent model objects.

As used herein, the term "allocation rules" refer to rules in the data model that determine how the resources from a model object are apportioned between/among other model objects in the data model. Also, such rules may be assigned to individual model line items. For example, if an email server line item has a value of $1000 an allocation rule may be defined such that 50% of the expense may be allocated to the Marketing department and 50% may be allocated to the Engineering department. Also, allocation rules may be applied at the model objects as well as the model line item level.

As used herein, the term "assignment ratios," refers to the results of applying one or more allocation rules and it is the distribution ratio of resources to model line items or model objects. For example, if $1000 may be allocated to Servers object, and the model line item Email Server is allocated $800 and the model line item FTP Server is allocated $200, the assignment ratios may be determined to 80% to model line item Email Server and 20% to model line item FTP Server. Assignment ratios may be explicitly defined by allocation rules. Or, in some case, they may be derived from allocation tables by converting the values into ratios of the total allocation to the model object.

As used herein, the term "external data source" refers to any separately located system that may enable or provide access to one or more datasets of information.

As used herein, the term "dataset" refers to a collection of data, usually presented in tabular form. Each column may represent a particular variable. Each row may represent a given member of the dataset. Also, it may list values for fields for each of the variables, such as name, location, cost, owner, manufacturer, serial number, or the like. In some embodiments, datasets may be ingested to produce data model objects for data models. Non-tabular datasets can also take the form of marked up strings of characters, such as an XML, file.

As used herein, the term "source object" refers to a model object in a data model that may be providing resource values that may be allocated to one or more other model objects (target objects).

As used herein, the term "target object" refers to a model object in a data model that may be allocated resources from one or more other model objects (source objects).

As used herein, the term "RACI," or "RACI information," or "RACI matrix" refer to information the describes the participation level or interest level of a person with respect to a projects, tasks, organizations, sub-organizations, or the like, modeled in a data model. RACI is an acronym derived from the terms Responsible, Accountable, Consulted, and Informed. These terms are typically used to describe the level of interest or level of participation of a person with the subject at hand. Accordingly, RACI information includes data that describes a person's interest in one or more parts or actions of an organization or a data model. RACI information may be used to capture a person's responsibilities or interests in modeled entities rather than attempting to establish categories or roles that users must fit into.

As used herein, the term "anchor point" refers to a location or position in a data model associated with a particular data object. An anchor point may be a starting point in the data model from which other neighboring (e.g., ancestor nodes or descendant nodes) may be selected.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed towards generating reports for visualizing data models. In one or more of the various embodiments, a RACI (Responsible, Accountable, Consulted, and Informed) engine may be instantiated to obtain RACI information for a user such that the RACI information may indicate the user's responsibility or interest in one or more data objects included in a data model. In one or more of the various embodiments, obtaining the RACI information may include: displaying a user-interface that lists a plurality of data objects that are included in the data model; tagging the one or more data objects as a responsibility of the user or of interest to the user based on one or more selections of the one or more data objects that are performed in the user interface; and including one or more references to the one or more data objects in the RACI information for the user.

In one or more of the various embodiments, the RACI engine may be arranged to perform further actions, including: comparing the data model to other RACI information such that the other RACI information may be associated with other users; determining one or more other data objects based on an absence of one or more indications of user responsibility or user interest in the one or more other data objects; and providing one or more notifications that the one or more other data objects are omitted from the other RACI information.

Also, in one or more of the various embodiments, the RACI engine may be arranged to perform further actions, including: comparing the data model to other RACI information such that the other RACI information may be associated with other users; determining one or more other data objects that are associated with two or more responsible users; and providing one or more notifications that the two or more users have responsibility for the same determined data objects.

Further, in one or more of the various embodiments, the RACI engine may be arranged to associate one or more of the one or more data objects with the user based on one or more inferences made by an ingestion engine, wherein the one or more inferences are derived from one or more raw data sets used to generate the data model.

In one or more of the various embodiments, a report engine may be instantiated to provide metadata that may be associated with a report for visualizing one or more portions of the data model.

In one or more of the various embodiments, the report engine may be arranged to provide one or more anchor points in the data model based on the metadata, the RACI information, and an index in a flattened version of the data model that corresponds to a geometry of the data model such that the one or more anchor points may be provided absent a traversal of the geometry of the data model.

In one or more of the various embodiments, the report engine may be arranged to provide a report template based on the one or more anchor points, the RACI information, and the metadata such that the report template includes references to one or more data objects that may be automatically selected based on the metadata and the one or more anchor points. In one or more of the various embodiments, providing the report template may include, including one or more of date formats, time formats, units, colors, fonts, punctuation, time zones, languages, currencies, or calendar formatting based on geolocation information provided by one or more sensors associated with a computer.

In one or more of the various embodiments, the report engine provides another report template based on one or more other anchor points, other RACI information, and the metadata, wherein the other report template includes references to one or more other data objects that are selected based on the other RACI information that is associated with the other user.

In one or more of the various embodiments, the report engine may display a report on a hardware display based on the report template such that the report provides one or more visualizations based on values associated with the one or more data objects.

Illustrated Operating Environment

FIG. 1 shows components of one embodiment of an environment in which at least one of the various embodiments may be practiced. Not all of the components may be required to practice various embodiments, and variations in the arrangement and type of the components may be made. As shown, system 100 of FIG. 1 includes local area networks ("LANs")/wide area networks ("WANs")–(network) 111, wireless network 110, client computer 101-104, and Modeling Platform Server 107.

Generally, client computers 102-104 may include virtually any portable computing device capable of receiving and sending a message over a network, such as network 111, wireless network 110, or the like. Client computers 102-104 may also be described generally as client computers that are configured to be portable. Thus, client computers 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDA's), handheld computers, laptop computers, wearable computers, tablet computers, integrated devices combining one or more of the preceding devices, or the like. As such, client computers 102-104 typically range widely in terms of capabilities and features. For example, a cell phone may have a numeric keypad and a few lines of monochrome Liquid Crystal Display (LCD) on which only text may be displayed. In another example, a web-enabled mobile device may have a touch sensitive screen, a stylus, and several lines of color LCD in which both text and graphics may be displayed.

Client computer 101 may include virtually any computing device capable of communicating over a network to send and receive information, including messaging, performing various online actions, or the like. The set of such devices may include devices that typically connect using a wired or wireless communications medium such as personal computers, tablet computers, multiprocessor systems, microprocessor-based or programmable consumer electronics, network Personal Computers (PCs), or the like. In one or more of the various embodiments, at least some of client computers 102-104 may operate over wired or wireless network. Today, many of these devices include a capability to access or otherwise communicate over a network such as network 111 or wireless network 110. Moreover, client computers 102-104 may access various computing applications, including a browser, or other web-based application.

In one or more of the various embodiments, one or more of client computers 101-104 may be configured to operate within a business or other entity to perform a variety of services for the business or other entity. For example, client computers 101-104 may be configured to operate as a web server, an accounting server, a production server, an email server, video game server, an inventory server, or the like. However, client computers 101-104 are not constrained to these services and may also be employed, for example, as an end-user computing node, in other embodiments. Further, it should be recognized that more or less client computers may be included within a system such as described herein, and embodiments are therefore not constrained by the number or type of client computers employed.

A web-enabled client computer may include a browser application that is configured to receive and to send web pages, web-based messages, or the like. The browser application may be configured to receive and display graphics, text, multimedia, or the like, employing virtually any web-based language, including a wireless application protocol messages (WAP), or the like. In one or more of the various embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, or the like, to display and send a message. In one or more of the various embodiments, a user of the client computer may employ the browser application to perform various actions over a network.

Client computers 101-104 also may include at least one other client application that is configured to receive or send data, including resource allocation information, report requests (e.g., queries) between another computing device. Client applications may include a capability to provide requests or receive data relating to the data models, reports, project information, allocation rules, or the like. The client application may provide data representing assignment or resource allocation changes, selecting reports, providing user RACI information, selecting templates, editing cost allocations between or among categories, generating or modifying allocation rules, or the like. In one or more of the various embodiments, client applications may receive or generate data related to data models and may generate tables and relationships between and among the data. In one or more of the various embodiments, client computers 101-104 may view or modify generated data models.

Wireless network 110 is configured to couple client computers 102-104 and its components with network 111. Wireless network 110 may include any of a variety of wireless sub-networks that may further overlay stand-alone ad-hoc networks, or the like, to provide an infrastructure-oriented connection for client computers 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G), 5th (5G) generation radio access for cellular systems, WLAN, Wireless Router (WR) mesh, or the like. Access technologies such as 2G, 3G, 4G, 5G, and future access networks may enable wide area coverage for mobile devices, such as client computers 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), High Speed Downlink Packet Access (HSDPA), Long Term Evolution (LTE), or the like. In essence, wireless network 110 may include virtually any wireless communication mechanism by which information may travel between client computers 102-104 and another computing device, network, or the like.

Network 111 is configured to couple network computers with other computing devices, including, modeling platform server computer 107, client computer(s) 101, and through wireless network 110 to client computers 102-104. Network 111 is enabled to employ any form of computer readable media for communicating information from one electronic device to another. Also, network 111 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. For example, various Internet Protocols (IP), Open Systems Interconnection (OSI) architectures, or other communication protocols, architectures, models, or standards, may also be employed within network 111 and wireless network 110. Furthermore, remote computers and other related electronic devices could be remotely connected to either LANs or WANs via a modem and temporary telephone link. In essence, network 111 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media. Such communication media is distinct from, however, processor-readable storage devices described in more detail below.

Figure 3:
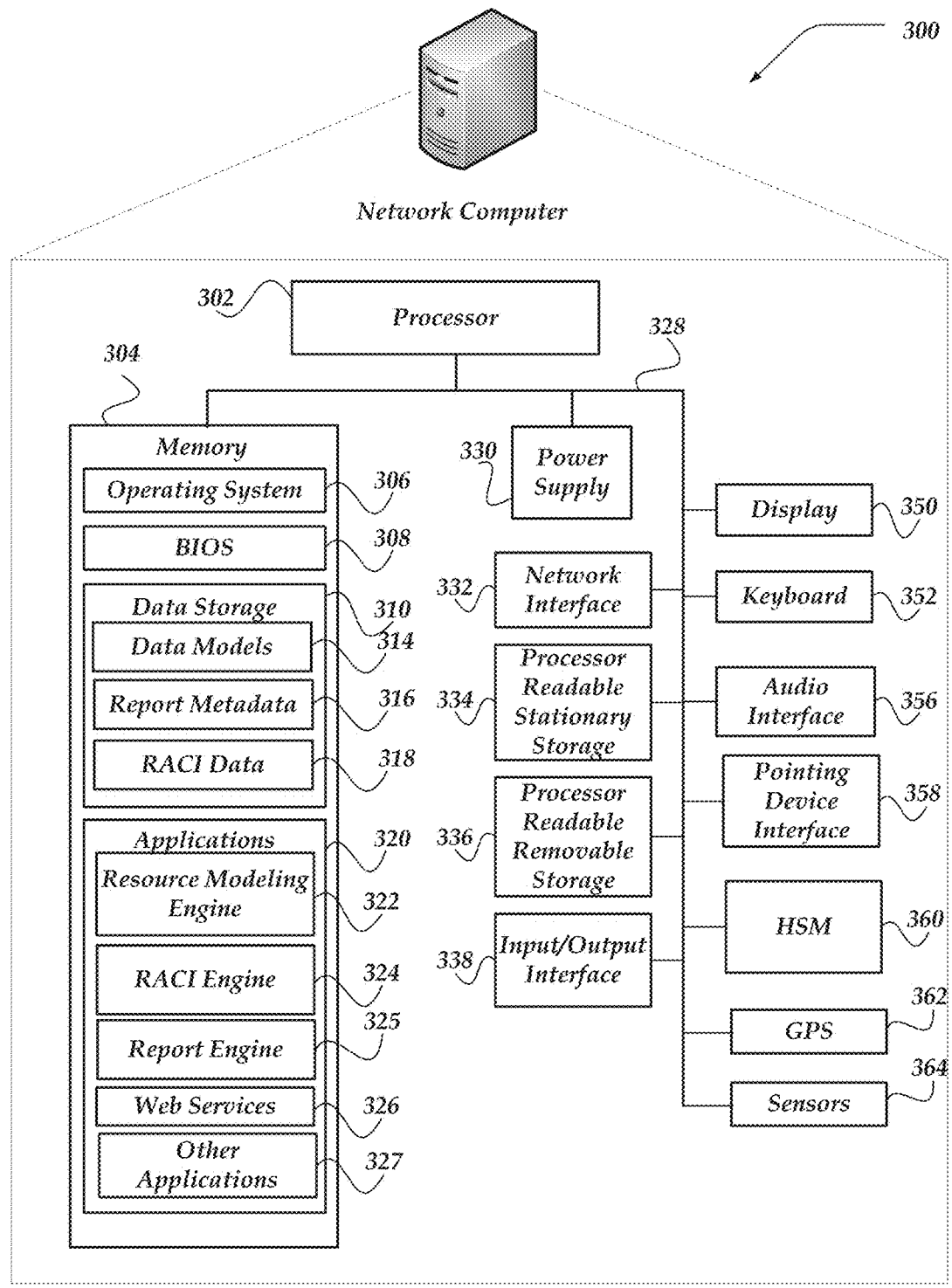
FIG. 3 illustrates one embodiment of a network computer that may be included in a system.

Modeling platform server computer 107 may include virtually any network computer usable to perform data processing operation that may be used for generating data models, allocation rules, recursive allocation rules, resource allocations, displays or reports thereof, such as network computer 300 of FIG. 3. In one or more of the various embodiments, modeling platform server computer 107 employs various techniques to create, define, generate, automated data processing applications for resource planning. Modeling platform server computer 107 may include modules for generating data processing applications that may provide and apply data models that may include dataset templates, category templates, allocation rules, or the like. Furthermore, modeling platform server computer 107 may include or generate one or more reports for visualizing the generated resource allocations, data models, allocation rules, or the like.

Devices that may operate as modeling platform server computer 107 include various network computers, including, but not limited to personal computers, desktop computers, multiprocessor systems, microprocessor-based or programmable consumer electronics, network PCs, server devices, tablet computers, network appliances, or the like. It should be noted that while modeling platform server computer 107 is illustrated as a single network computer, the invention is not so limited. Thus, in another embodiment, modeling platform server computer 107 may represent a plurality of network computers. For example, in one or more of the various embodiments, modeling platform server computer 107 may be distributed over a plurality of network computers or implemented using cloud architecture.

Moreover, modeling platform server computer 107 is not limited to a particular configuration. Rather, modeling platform server computer 107 may operate using a controller/worker approach over a plurality of network computers, within a cluster, a peer-to-peer architecture, cloud-based architecture (e.g., virtual machines), or any of a variety of other architectures. Thus, modeling platform server computer 107 is not to be construed as being limited to a single environment, and other configurations, and architectures are also envisaged. modeling platform server computer 107 may employ processes and architectures described below to perform at least some of its actions.

Illustrative Client Computer

Figure 2:
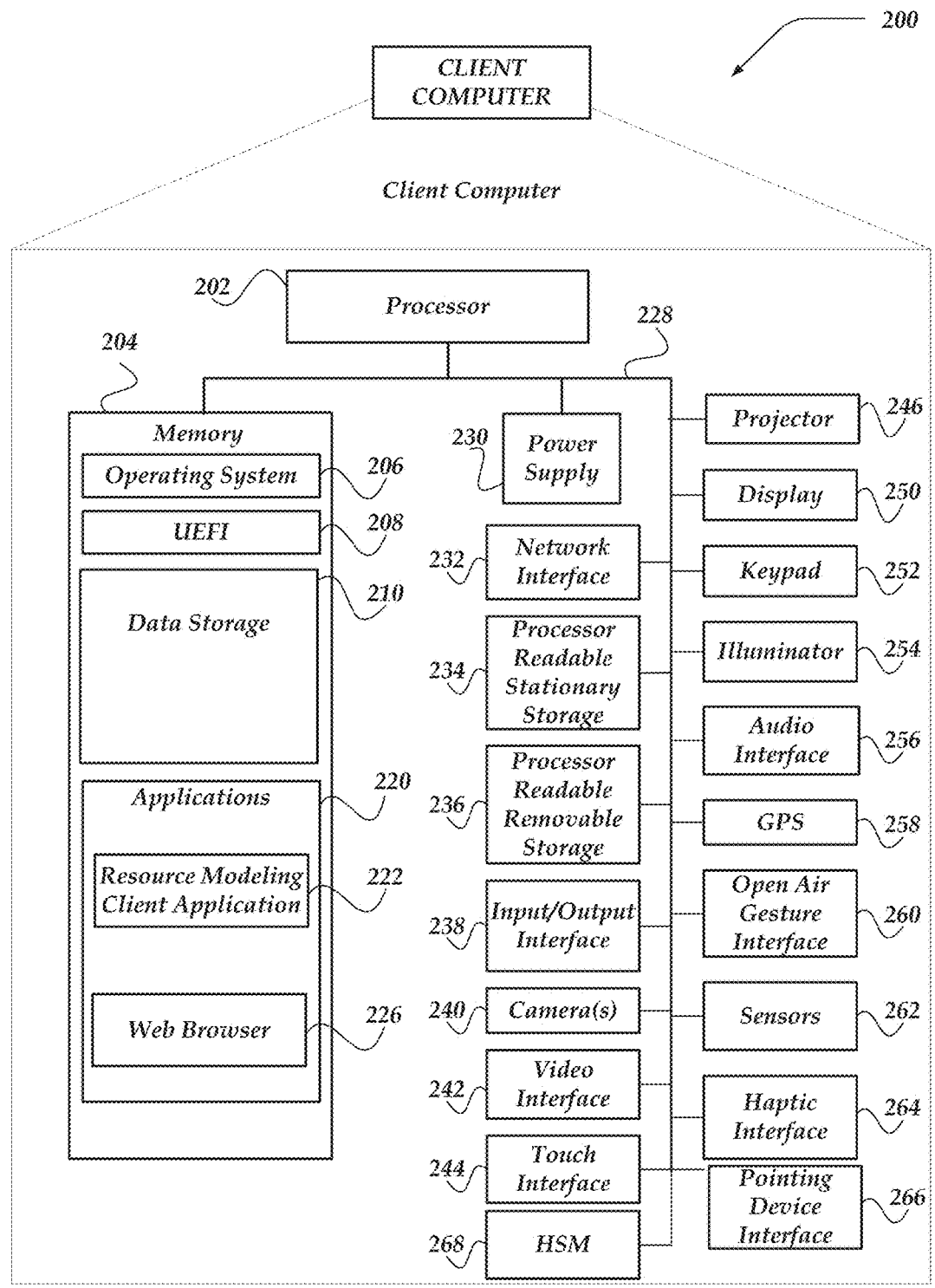
FIG. 2 shows one embodiment of a client computer that may be included in a system.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to events. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Haptic interface 264 may be arranged to provide tactile feedback to a user of the client computer. For example, the haptic interface 264 may be employed to vibrate client computer 200 in a particular way when another user of a computer is calling. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

In one or more of the various embodiments, client computer 200 may also include sensors 262 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 262 may be one or more hardware sensors that collect or measure data that is external to client computer 200

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiment, however, client computer 200 may, through other components, provide other information that may be employed to determine a physical location of the client computer, including for example, a Media Access Control (MAC) address, IP address, and the like.

In one or more of the various embodiments, applications, such as, operating system 206, resource modeling client application 222, web browser 226, or the like, may be arranged to employ geo-location information to select one or more localization features, such as, time zones, languages, currencies, calendar formatting, or the like. Localization features may be used in data objects, data models, reports, report meta-data, file systems, RACI information, user-interfaces, as well as internal processes or databases. In one or more of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that may be configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store Unified Extensible Firmware Interface (UEFI) 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™. The operating system may include, or interface with a Java or JavaScript virtual machine modules that enable control of hardware components or operating system operations via Java application programs or JavaScript programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of events, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, resource modeling client application 222. In one or more of the various embodiments, resource modeling client application 222 may be used to exchange communications to and from modeling platform server computer 107, including, but not limited to, queries, searches, API calls, reports, RACI information, configuration information, or the like.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of one or more CPUs, such as, an Application Specific Integrated Circuits (ASICs), Field Programmable Gate Arrays (FPGAs), Programmable Array Logic (PAL), or the like, or combination thereof. The embedded logic hardware devices may directly execute embedded logic to perform actions. Also, in one or more embodiments (not shown in the figures), the client computer may include one or more hardware microcontrollers instead of one or more CPUs. In one or more embodiment, the microcontrollers be system-on-a-chips (SOCs) that may directly execute their own embedded logic to perform actions and access their own internal memory and their own external Input and Output Interfaces (e.g., hardware pins or wireless transceivers) to perform actions.

Illustrative Network Computer

FIG. 3 shows one embodiment of network computer 300 that may be included in a system implementing one or more embodiments of the described innovations. Network computer 300 may include many more or less components than those shown in FIG. 3. However, the components shown are sufficient to disclose an illustrative embodiment for practicing these innovations. Network computer 300 may represent, for example, one embodiment of modeling platform server computer 107 of FIG. 1.

As shown in the figure, network computer 300 includes a processor 302 in communication with a memory 304 via a bus 328. Network computer 300 also includes a power supply 330, network interface 332, audio interface 356, global positioning systems (GPS) receiver 362, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. Display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

GPS transceiver 362 can determine the physical coordinates of network computer 300 on the surface of the Earth, which typically outputs a location as latitude and longitude values. GPS transceiver 362 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 362 can determine a physical location for network computer 300. In one or more embodiments, however, network computer 300 may, through other components, provide other information that may be employed to determine a physical location of the client computer, including for example, a Media Access Control (MAC) address, IP address, and the like.

In one or more of the various embodiments, applications, such as, operating system 306, resource modeling engine 322, RACI engine 324, report engine 325, web services 326, other applications 327, or the like, may be arranged to employ geo-location information to select one or more localization features, such as, date formats, time formats, units, colors, fonts, punctuation, time zones, languages, currencies, calendar formatting, or the like. Localization features may be used in data objects, data models, reports, report meta-data, file systems, RACI information, user-interfaces, as well as internal processes or databases. In one or more of the various embodiments, geo-location information used for selecting localization information may be provided by GPS 362. Also, in some embodiments, geolocation information may include information provided using one or more geolocation protocols over the networks, such as, wireless network 110 or network 111.

Network computer 300 may also include sensors 364 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 364 may be one or more hardware sensors that collect or measure data that is external to network computer 300

In one or more embodiment, however, network computer 300 may, through other components, provide other information that may be employed to determine a physical location of the client computer, including for example, a Media Access Control (MAC) address, IP address, and the like.

Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

Memory 304 may include Random Access Memory (RAM), Read-Only Memory (ROM), or other types of non-transitory computer readable or writeable media. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer, including being sent as part of a header during a communication, sent upon request, or the like. Data storage 410 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, data models 314, report metadata 316, RACI data 318, or the like.

Applications 320 may include computer executable instructions which, when executed by network computer

300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include resource modeling engine 322, RACI engine 324, report engine 325, web services 326, other applications 327, or the like, that may perform actions further described below. In one or more of the various embodiments, one or more of the applications may be implemented as modules or components of another application. Further, in one or more of the various embodiments, applications may be implemented as operating system extensions, modules, plugins, or the like.

In one or more of the various embodiments, applications, such as, resource modeling engine 322, RACI engine 324, report engine 325, web services 326, other applications 327, or the like, may be arranged to employ geo-location information to select one or more localization features, such as, time zones, languages, currencies, calendar formatting, or the like. Localization features may be used in user-interfaces, reports, as well as internal processes or databases. In one or more of the various embodiments, geo-location information used for selecting localization information may be provided by GPS 362. Also, in some embodiments, geolocation information may include information provided using one or more geolocation protocols over the networks, such as, wireless network 108 or network 111.

Furthermore, in one or more of the various embodiments, resource modeling engine 322, RACI engine 324, report engine 325, web services 326, other applications 327, or the like, may be operative in a cloud-based computing environment. In one or more of the various embodiments, these engines, and others, that comprise the modeling platform that may be executing within virtual machines or virtual servers that may be managed in a cloud-based based computing environment. In one or more of the various embodiments, in this context applications including the engines may flow from one physical network computer within the cloud-based environment to another depending on performance and scaling considerations automatically managed by the cloud computing environment. Likewise, in one or more of the various embodiments, virtual machines or virtual servers dedicated to resource modeling engine 322, RACI engine 324, report engine 325, web services 326, other applications 327, or the like, may be provisioned and de-commissioned automatically.

Further, in some embodiments, network computer 300 may also include hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, or store keys pairs, or the like. In some embodiments, HSM 360 may be arranged as a hardware card that may be installed in a network computer.

Additionally, in one or more embodiments (not shown in the figures), network computer 300 may include an one or more embedded logic hardware devices instead of one or more CPUs, such as, Application Specific Integrated Circuits (ASICs), Field Programmable Gate Arrays (FPGAs), Programmable Array Logic (PALs), or the like, or combination thereof. The one or more embedded logic hardware devices may directly execute its embedded logic to perform actions. Also, in one or more embodiments (not shown in the figures), the network computer may include one or more hardware microcontrollers instead of one or more CPUs. In one or more embodiment, the one or more microcontrollers may directly execute embedded logic to perform actions and access their own internal memory and their own external Input and Output Interfaces (e.g., hardware pins or wireless transceivers) to perform actions. E.g., they may be arranged as Systems On Chips (SOCs).

In one or more of the various embodiments, resource modeling engine 322, RACI engine 324, report engine 325 may be instantiated to enable a user to generate project plans, allocation rules, data models, reports, what-if-analysis, or the like. Also in one or more of the various embodiments, resource modeling engine 322, RACI engine 324, report engine 325 may employ processes, or parts of processes, similar to those described below.

Illustrative Logical System Architecture

FIGS. 4-8 are presented to illustrate logical architectures at least one of the various embodiments for report generation based on user responsibility.

Figure 4:
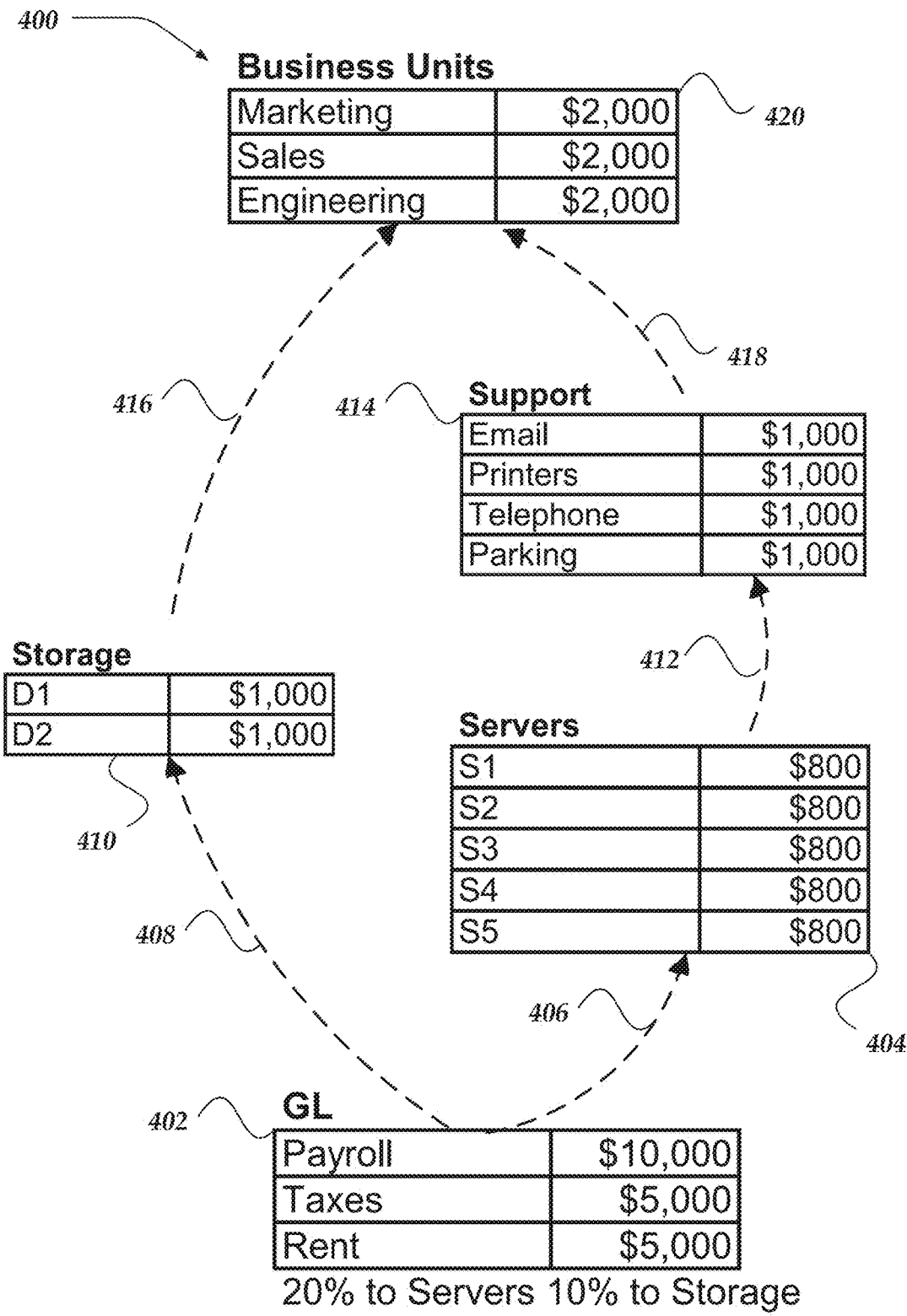
FIG. 4 illustrates a portion of a logical architecture for a data model that may be enabled by at least one of the various embodiments.

FIG. 4 illustrates a portion of a logical architecture for data model 400 that may be enabled by at least one of the various embodiments.

In one or more of the various embodiments, model 400 may have five objects: GL 402, Servers 404, Storage 410, Support 414, and Business Units 420. In one or more of the various embodiments, each object in data models contains or references a set of resource cost line items. For example, GL 402 includes resource cost line items for Payroll, Taxes and Rent. Likewise, Support 414 includes resource cost line items Email, Printers, Telephone, and Parking. In one or more of the various embodiments, each resource cost line item has one or more associated resource values. For example, Storage 410 has two resource cost line items, D1, and D2 (e.g., disk drives) having associated resource cost values of $1000 each.

Allocation rules may be used to connect objects of data model 400. In one or more of the various embodiments, allocation rules may show how resources flow between the objects modeled by data model 400. Resulting in a graph where the objects may be represented as nodes and the allocation rules may be represented as edges. In one or more of the various embodiments, generally a data model may be represented by a directed acyclic graph but that is not a requirement for an operative model. In one or more of the various embodiments, a model graph may contain cycles that are resolved or estimated using mathematical techniques, including but not limited to Gaussian elimination, Cholesky decomposition or Newton's method.

In one or more of the various embodiments, data models may be arranged to be stored in self-referential database such that some or all of the data objects for a data model may be stored in the same table. Accordingly, different records in the table may be arranged to include references to other records in the same table that also represent data model objects for a data model. Accordingly, in some embodiments, the graph structure of a data model may be represented in a single table rather than require normalized databased tables. Accordingly, in some embodiments, the performance of one or more processors, such as, processor 302 is improved because data models may be traversed by scanning through a single table rather than having to execute slower performing database query joins that may consume more processor resources or memory resources, or the like.

In one or more of the various embodiments, allocation rule 406 represents a rule allocating 20% of the resources of object GL 402 (source object) to Servers object 404 (target object). In this example, GL 402 includes resources values at $20,000, thus 20% of $20,000 (e.g., $4,000) flows based on allocation rule 406 to Servers 404. Likewise, allocation rule 408 may allocate $2,000 from GL 402 to Storage 410. The other allocation rules in data model 400 allocate 100% of the resource to the next data object: allocation rule 412 directs 100% of the resources (e.g., $4,000) to flow to Support 414; allocation rule 418 directs 100% of the resources in Support (e.g., $4,000) to flow to Business Units 420; and allocation rule 416 directs 100% of the resources from Storage 410 to flow to Business Units 420.

In one or more of the various embodiments, resources that flow into a data object may be allocated among the included resource cost line items. In one or more of the various embodiments, each object may have one or more rules that may describe how resources (e.g., assignment ratios) coming into to a data object are allocated or assigned to resource cost line items. In this example, for data objects 404, 410, 414, and 420, simple allocation rules assign the resources in the object evenly among the resource cost line items comprising each data object. Each may have its own allocations rules and assignment ratios, for example, GL 402 in this non-limiting example, the assignment ratio for resource cost line items may be 50% to Payroll, 25% to Taxes, and 25% to Rent.

In one or more of the various embodiments, an assignment ratio may represent how the resources in an organization may be assigned to the actual resource cost line items. In one or more of the various embodiments, allocation rules may be executed to distribute the resources based on definitions provided by the users or administrators who designed the data model. In one or more of the various embodiments, the assignment ratios and allocation rules may be modified as part of the modeling process.

The data model 400 is a simplified model useful for facilitating discussion and understanding of the embodiments. Allocation rules for models of large organizations can be numerous and complex. However, model 400 is at least sufficient to enable one of ordinary skill in the art to practice what is claimed herein.

Figure 5:
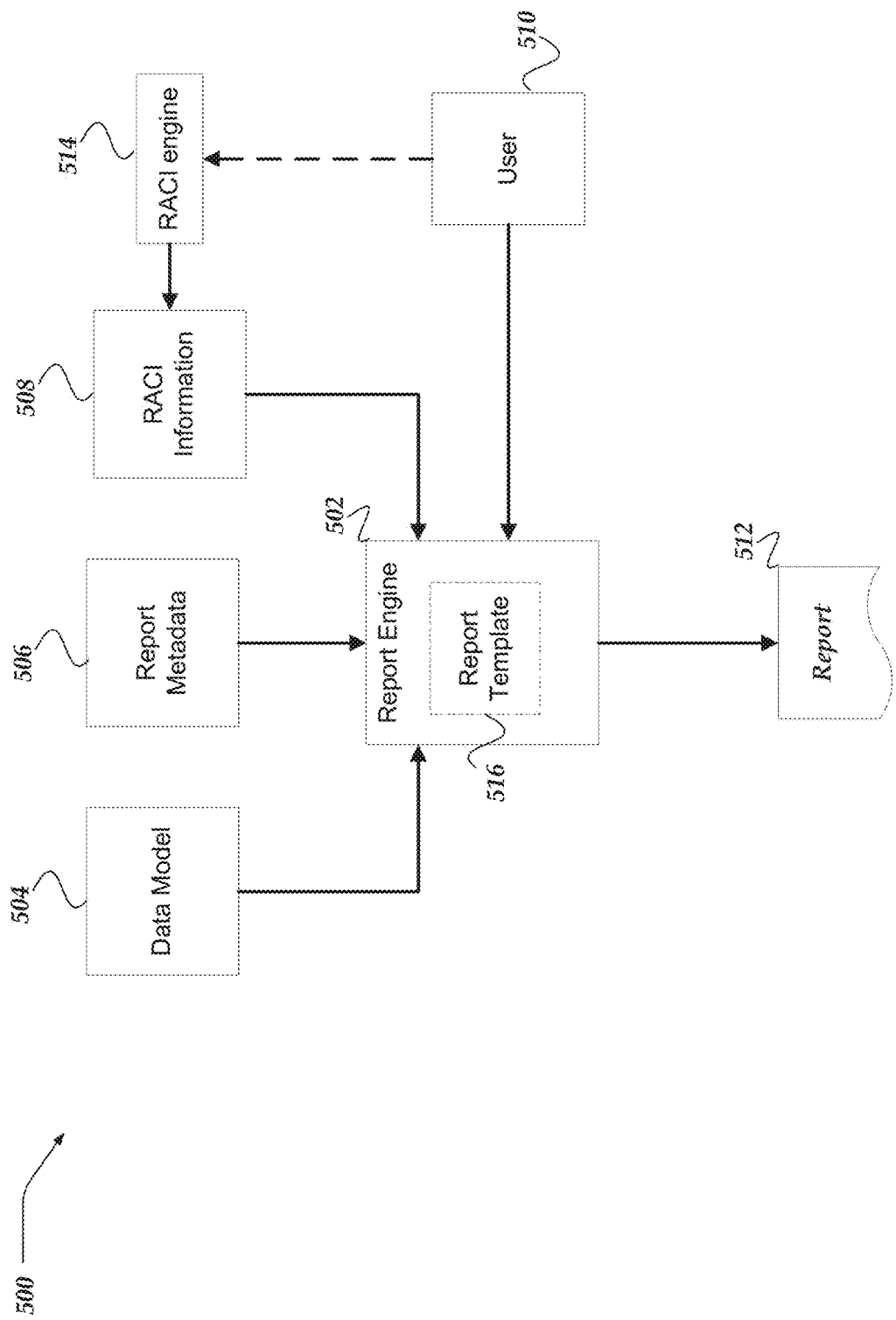
FIG. 5 illustrates a logical architecture of a system for report generation based on user responsibility in accordance with one or more of the various embodiments.

FIG. 5 illustrates a logical architecture of system 500 for report generation based on user responsibility in accordance with one or more of the various embodiments. In some embodiments, system 500 may include one or more components, such as report engine 502, data model 504, report metadata 506, RACI information 508, or the like, to generate report 512 that may be automatically customized for a user, such as, user 510. Further, in some embodiments, report template 516 may be an interstitial object that may be created on-the-fly by merging report metadata with RACI information. In one or more of the various embodiments, report templates may be cached or stored for re-use.

In one or more of the various embodiments, user 510 may be enabled to access report engine 502 to view one or more reports, such as report 512. Reports may be various visualizations, summaries, charts, or the like, or combination thereof, that may be based on data model 504. In some embodiments, reports may be interactive reports that have a graphical user-interface that enable users to perform various interactions in various ways with the reports, such as, browse, drill down, filter, slice, or the like, to view different details, views, relations, or the like, that may be associated with data objects or data object information included in the report.

In one or more of the various embodiments, different persons (e.g., users) in an organization may have different needs or requirement regarding the information they need or would like to see in reports. In some embodiments, a person's role in an organization may determine the content, scope, format, or the like, of the reports they view. Also, in some embodiments, because often persons in organizations may have responsibilities or interests that go beyond well-defined roles, reports may be customized based on the responsibilities or interests of an individual.

In one or more of the various embodiments, a RACI engine, such as RACI engine 514 may be arranged to collect the areas of responsibility or interest for users. Accordingly, in some embodiments, user 510 may provide RACI information to RACI engine 514. In some embodiments, the RACI engine 514 may provide user-interfaces that are arranged to collect RACI information for a user. In some embodiments, the first time user 510 attempts to access report engine 502, RACI engine 514 may present a user-interface to survey the responsibilities or interests of the user. Accordingly, in one or more of the various embodiments, report engine 502 may use user 510 RACI information if generating reports for user 510.

In one or more of the various embodiments, report engine 502 may be arranged to employ report metadata 506 that describes the general layout or included objects for a report with the a user's RACI information to generate a report that customized for a given user.

In one or more of the various embodiments, RACI information may include a set of data objects, departments, locations, projects, or the like, that a user may indicate a level of interest. In some embodiments, RACI information includes ranking or importance indicators that may be associated with the items of interest. For example, in classic RACI, an item be tagged or marked based on according to the RACI acronym (e.g., Responsibility, Accountable, Consulted, and Informed), or the items may be grouped more generally, such as Responsible For, Interested In, and so on. Here, this information is termed RACI information because it is a well-known way to refer to information related to classifying user interests in projects, outcomes, and so on. But, these innovations are not limited to using to the four RACI categories for categorization of user interests.

In one or more of the various embodiments, report metadata 506 may include detailed information regarding the layout of reports as well as where objects should be included in the report. In one or more of the various embodiments, different or separate report metadata may be designed to produce different types of reports. Accordingly, reports may be designed via report metadata to support different classes of reports that may be individually personalized based on RACI information associated with a user. In some embodiments, report metadata may comprise a data structure that include fields or properties that are merged, expanded, or substituted based on user RACI information.

In one or more of the various embodiments, RACI information 508 may be stored in database or data store and associated with an individual user. In one or more of the various embodiments, RACI engine 514 may collect user RACI information via surveys, web forms, or the like. Also, in some embodiments, RACI engine may be arranged to provide suggest or default RACI information. Default RACI information may be associated with one or more classes of users or associated with various groups, sub-groups, or the like.

In one or more of the various embodiments, personalized report templates, such as, report template 516, may be generated by merging report metadata and user RACI information. In some embodiments, report templates may be stored or cached for re-use. In some embodiments, a report engine may be arranged to test if a user's RACI information or a report's report metadata has been modified before using a stored or cached report template. Accordingly, in some embodiments, the report template may be regenerated using updated metadata or RACI information if they have changed since the report template was generated.

Figure 6:
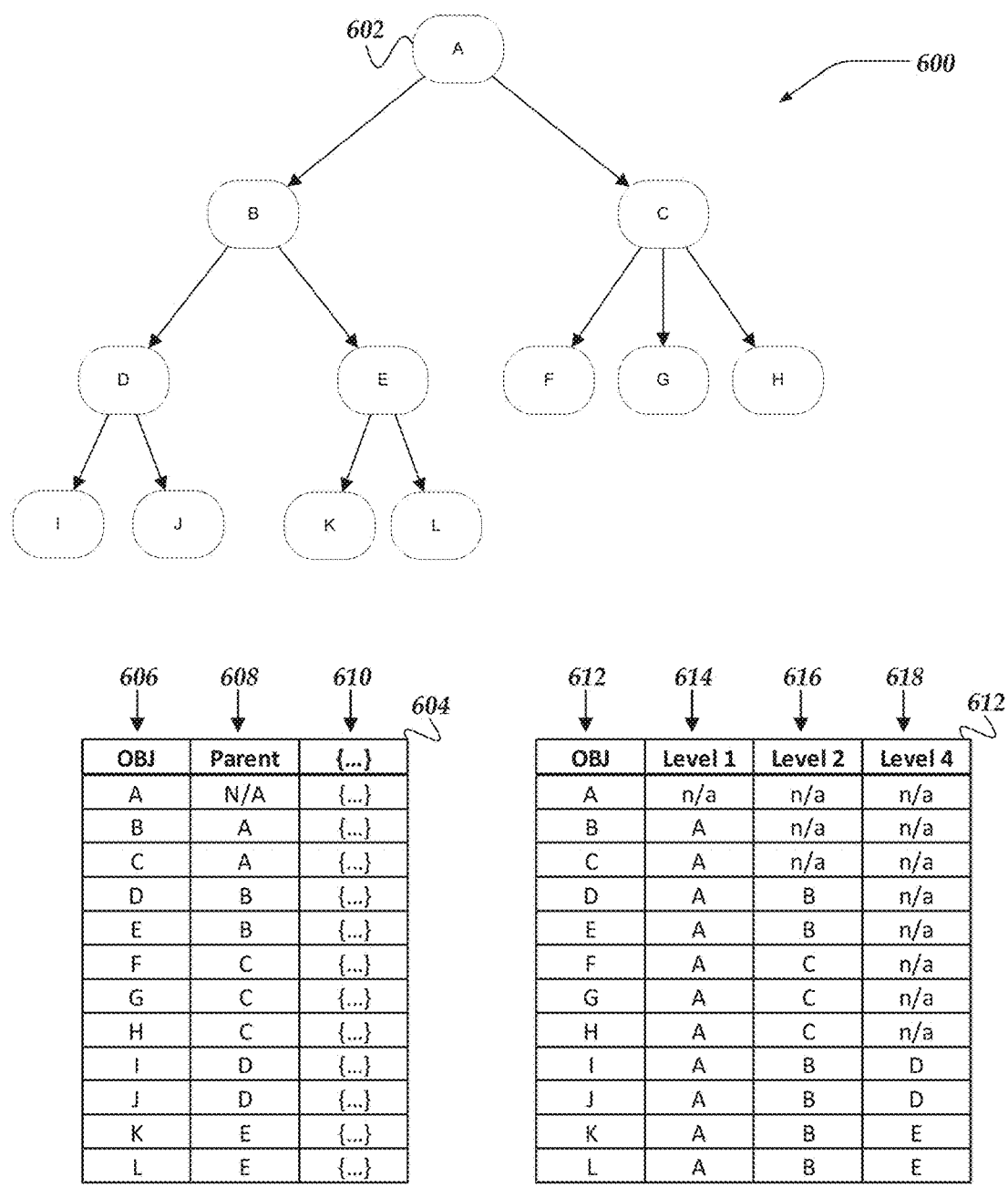
FIG. 6 illustrates a logical architecture of a system used during report generation based on user responsibility in accordance with one or more of the various embodiments.

In one or more of the various embodiments, report metadata may be stored in various formats, including, Javascript object notation (JSON), extensible markup language (XML), database records, text files, comma separated values (CSV), or the like. Report metadata may include notation that indicates FIG. 6 illustrates a logical architecture of system 600 used during report generation based on user responsibility in accordance with one or more of the various embodiments. One of ordinary skill in the art will appreciate that a report engine may be arranged to use numerous data structures, including, data models, data objects, report metadata objects, report templates, or the like. In one or more of the various embodiments, report engines may be arranged to merge data from the various data structures to generate report templates or reports. In this example, system 600 includes various data structures associated with improving a processors performance for traversing data models to determine depth of a given data object within the hierarchy of a data model. In this example, data model 602 may represent an organization chart (e.g., org chart) for an organization. Or, it may represent relationships between other types of data objects. In in the interest of clarity, the nodes in data model 602 are referenced herein using their node labels (e.g., A, B, C, . . . ) rather than using number references which could be confusing.

In this example, node A represents the root object of data model 602. If data model 602 represents and org chart, node A may represent a top level department, such as an executive team. Node B and node C are one level down in the model, they may represent high level departments such as engineering or sales. Similarly, the remainder of the nodes in data model 602 may represent other parts of an organization.

In one or more of the various embodiments, if the RACI information associated with a user indicates that the user is responsible for node L and node K, those data objects may be included in reports for the user. Similarly, if other RACI information that is associated with another user indicates that the user is responsible for node C, node C may be included in the reports.

In one or more of the various embodiments, report metadata may include field modifiers that indicate if a user is responsible for a node and its children (if any), or just the node itself. For example, report metadata may mark a report item using 'R1' that may mean that the user is responsible for just the one item or object. In other cases, report metadata may mark a report item using 'Rn' that may mean that the user is responsible for the item and its children, if any. Accordingly, in some embodiments, if an item has child items (e.g., dependent objects in the data model) a report engine may be arranged to automatically display the child items in the report because a user is likely to want to see information about the children as well as the parent.

In some embodiments, (for various reasons) report engines may be required to quickly determine an objects children, if any, or its parent, if any. Accordingly, in one or more of the various embodiments, data structure 604 and data structure 612 may be arranged provide a flattened representation of data model 602.

Accordingly, a data structure, such as, data structure 604 may be arranged to represent data model 602. In this example, data structure 604 includes, column 606 to hold the name or identify of a data object that corresponds to a node in data model 602. Also, data structure 604 may include column 608 for storing parent objects of an object. And, in some embodiments, there will be additional columns that include other properties or features of data object, represent here by column 610.

Also, in one or more of the various embodiments, another data structure, such as data structure 612 may be arranged to represent how an object fits into its data model. Accordingly, in this example, data structure 612 include column 612 for storing an object name or identifier and columns 614-618 for storing level or hierarchy information associated with an object.

Figure 7:
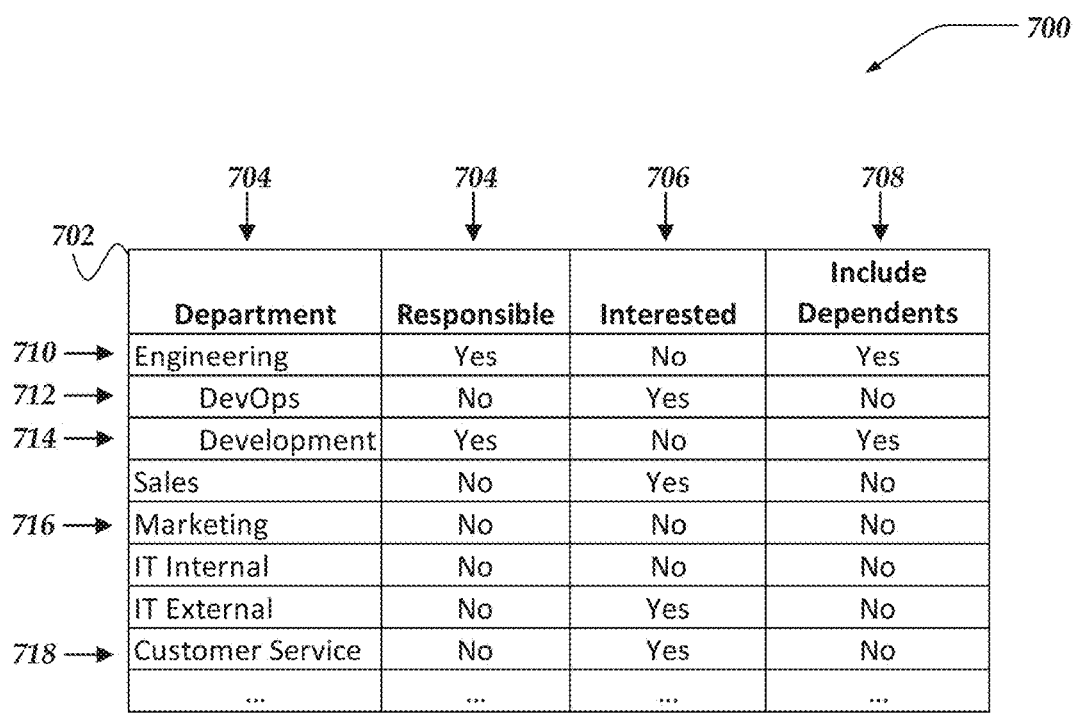
FIG. 7 illustrates a user interface for collecting RACI information for a user in accordance with one or more of the various embodiments.

FIG. 7 illustrates a user interface 700 for collecting RACI information for a user in accordance with one or more of the various embodiments. In one or more of the various embodiments, a RACI engine, such as, RACI engine may be arranged to provide one or more user interfaces to collect RACI information from users. In this example, form 702 may be presented to a user if they log on to the system. The system may be configured to present a form, such as, form 702 to users the first time they log into the system. In other embodiments, users may be shown form 702 each time they log in so they may confirm their current RACI information. Also, in some embodiments, users may be prompted to updated their RACI information periodically as defined in configuration information (e.g., each day, each month, or the like). Further, in some embodiments, users may be prompted to update of confirm their RACI information if the underlying data model changes. For example, if new objects are added to a model or existing objects or the hierarchy of objects is modified, the user may be prompted to update their RACI information.

In one or more of the various embodiments, form 702 may include various columns associated with RACI information. In this non-limiting example, column 704 holds the name or description associated with the data objects; column 704 shows if the user has indicated that they are responsible for the object; column 706 shows if the user has indicated that they are interested in the object; and column 708 shows if the user has indicated if they are responsible or interested in the dependent objects associated with a given object.

Accordingly, in this example, row 710 shows that the user is responsible for the Engineering Department and some or all of its dependents. Similarly, in this example, row 712 shows that the user is interested in the DevOps department and row 714 shows that the user is responsible for the Development department and its dependents (not shown here). Also, in this example, row 716 shows that the user is not responsible nor interested in the Marketing Department. And, in this example, row 718 shows that the user is interested in the Customer Service Department.

In one or more of the various embodiments, the distinction between Responsible or Interested may vary depending on the organization or the report. But generally, reports designed for users that are responsible for objects may be different than reports that designed for objects that a user is interested in. For example, in some embodiments, report metadata may be arranged to show or highlight report components associated with objects a user is responsible for as compared to how objects a user is interested in are displayed. In cases, for example, if a user is responsible for one or more objects, report elements associate with those objects may be displayed at the top of report while objects a user is interested in may be display further down.

In one or more of the various embodiments, a RACI engine may be arranged to present suggested RACI information based on other information about the user. For example, if the user is known to in the Engineering department, forms, such as, form 702 may be pre-populated with entries tailored to users that are in the Engineering department. In some embodiments, the RACI engine may use configuration information to set the initial or default RACI information. In other embodiments, the RACI engine may be arranged to select default entries based on selections made by other similar users, such as, other users in the same team, group, or department, or the like.

In one or more of the various embodiments, user interfaces used for collecting RACI information may be arranged differently than form 702. Also, in some embodiments, such user interfaces may include additional columns or rows, including different or additional user responsible/interested categories. Likewise, different user interface controls may be provided, or the like. Here, form 702 has been deliberately shown using simplified format for clarity and brevity. Accordingly, one of ordinary skill in the art will appreciate that the arrangement or format of form 702 may vary widely without departing from the scope of the innovations described herein.

Figure 8:
FIG. 8 illustrates an example of a portion of report metadata in accordance with one or more of the various embodiments.

FIG. 8 illustrates an example of a portion of report metadata 800 in accordance with one or more of the various embodiments. In one or more of the various embodiments, report metadata may include one or more data structures that define a type or class of reports. In one or more of the various embodiments, report metadata, such as, report metadata 800 includes definitions for the one or more elements of a report, including information describing the data objects, fields in the data objects, or the like, that may be included in a report. In some embodiments, report metadata may leverage one or more well-known or customized schemas, that may be used to describe data objects included in a data model. Accordingly, report metadata may have entities that are correlated with the structure or composition of one or more data model included in the modeling system.

In this example, property 802 is a text description that is associated with report metadata 800. In this case, the description is "Server Report" because report metadata 800 is for reports related to servers in an organization. In this non-limiting example, report metadata 800, defines one or more element (e.g., elements 804) that comprise "Server Reports". Each element may represent data objects or other portions of the data model that may be used for generated the reports that are based on the report metadata.

In this example, element 806 is named "Servers" and element 814 is named "Storage". In some embodiments, elements define various report features that may be provide hints of guidance to the report engine when generating reports. In this example, element 806 ("Servers") include feature 808 that defined a focus of element 806. Likewise, element 806 includes feature 810 that defines a second focus of element 806. In this example, feature 808 and feature 810 define data objects that the report may be focused on. In this example, feature 808 includes the string "*.Servers" which in this example, may consider a reference to Server data objects in the data model. The asterisk ("*.") may be considered a wildcard/placeholder that may be filled in with data objects based on RACI information. Also, in this example, feature 812 represents grouping (e.g., group-by) information that may be used in reports for grouping or aggregating results. In this example, element 806 (Servers) has two group features defined, group1 that groups Servers based on operating system (OS) and group2 for grouping Servers by location. Also, in this example, a second element, element 814 is shown. Here, element 814 represents that the report may include data objects (and data object fields) related to Storage data objects.

In this example, for one or more of the various embodiments, feature 810 defines a focus that has "*.*..." as the place holder. Accordingly, feature 810 is arranged to capture Servers data objects that are dependent on the focus object of feature 808.

In one or more of the various embodiments, report engines, such as report engine 325 may be arranged to merge a user's RACI information with one or more sets of report metadata to provide reports based on user responsibility or interest.

FIG. 9 illustrates a portion of report template 900 for generating reports in accordance with one or more of the various embodiments. As described herein, report engines may be provided report metadata for a report and a user's RACI information to generate report templates that may be populated with data object values. In this example, report template 900 may be considered to be synthesized from the RACI information shown in FIG. 7 and the report metadata shown in FIG. 8.

Accordingly, in one or more of the various embodiments, report template 900 includes item 902 that has been synthesized from report metadata 800 and RACI information 700. Here, in this example, the "*." from feature 804 of report metadata 800 is expanded to "Engineering" in item 902 because RACI information in FIG. 7 shows that the user is responsible for the Engineering department. Accordingly, if that user requests a Server report the report engine may be arranged to assume that the Server report is for the Engineering department so Servers in the Engineering department should be included in the report template.

Also, since the user has indicated that they are responsible for the Engineering department, a "R" with a rank or weight of 100 is included in item 902. In some embodiments, rank or weight values may be associated with various items in a report or report template. In some embodiments, the rank or weight value may be employed as tie-breaker or prioritization value. For example, in some embodiments, report meta-data may indicate that the report should be pivoted by Department if the user is interested in more than one department and also that the report should be pivoted by Cost Center if the user is responsible for more than one cost center. In this example, for the user who meets both criteria (interested in multiple departments and also responsible for multiple cost centers), the weighting value may be applied. For example, if a weight of 10 is associated with the pivot for users interested in multiple departments and a weight of 100 associated with the pivot for users responsible for multiple cost centers, the report engine may resolve the ambiguity by evaluating the weights, selecting the one with the highest value. Accordingly, in this example, the report engine would pivot the reports by cost center since the weighting there is 100 versus only 10 for multiple departments.

Also, in one or more of the various embodiments, report template 800 includes feature 806 (focus2) that includes the expression *.*.Servers. Further, in this example, for some embodiments, the report engine may interpret the two-level placeholder (*. *.) to mean that if there are sub-departments (or dependent objects) in the data model, this report should show them as well.

In one or more of the various embodiments, the report engine may determine one or more anchor points in the data model based on flattened data structures such as data structure. Accordingly, the anchor points in the data model may be used to locate the ancestors or descendent objects that should be included in the report template. In one or more of the various embodiments, an index in the flattened version of the data model (e.g., data structure 612) that corresponds to a geometry of the data model may be used to provide the one or more anchor points absent a traversal of the geometry of the data model.

Accordingly, since in FIG. 7 it shows that Engineering has two sub-departments, those departments are expanded as well. In this example, item 904 and item 906 are included based on feature 810. Note, in some embodiment, the report engine may be arranged to expand a single feature in report metadata (e.g., feature 810) into two or more items in the report template. As results, the report may show server information for the Engineering department and its sub-departments. In some embodiments, the one or more anchor points discussed above may be used a starting point to identify the ancestors or descendants of data objects that may be called for by the RACI information and the report metadata.

In one or more of the various embodiments, if the user's RACI information indicating that the user is responsible for the Marketing department rather than the Engineering department, the Marketing data object would be in the corresponding report template rather than the Engineering data object. Likewise, if the Marketing data object has dependent objects that also include Servers, those would be included in the report template. Accordingly, the reports provided by the report engine may be automatically customized based on the users responsibilities or interests.

Similarly, in one or more of the various embodiments, if a user was responsible just for the Devops department rather than the Engineering department, Engineering.Devops,Servers . . . would be the object included in item 902. Likewise, if Devops had sub-departments (e.g., child data objects) that had Servers, those one or more sub-departments would be included as well.

In one or more of the various embodiments, from a report template, such as, report template 900, the report engine may generate an interactive report that includes information that is relevant to the user.

One of ordinary skill in the art will appreciate that in one or more of the various embodiments, report metadata may include fewer or more elements, features, or the like, than shown here. Also, in one or more of the various embodiments, report metadata may include formatting information, including additional rules, hints, layout information, conditions, filters, or the like, that may be used by the report engine to generate reports. However, the report metadata and report template shown here are sufficient to disclose the innovations included herein. Additional features, items, rules, hints, formatting, filters, layout information, or the like, have been omitted for brevity and clarity.

Generalized Operations

FIGS. 10-13 represent the generalized operations for models for report generation based on user responsibility in accordance with at least one of the various embodiments. In one or more of the various embodiments, processes 1000, 1100, 1200, and 1300 described in conjunction with FIGS. 10-13 may be implemented by or executed on a single network computer, such as network computer 300 of FIG. 3. In other embodiments, these processes or portions thereof may be implemented by or executed on a plurality of network computers, such as network computer 300 of FIG. 3. However, embodiments are not so limited, and various combinations of network computers, client computers, virtual machines, or the like, may be utilized. Further, in one or more of the various embodiments, the processes described in conjunction with FIGS. 10-13 may be operative in resource modeling and providing report generation based on user responsibility such as described in conjunction with FIGS. 4-9.

Figure 10:
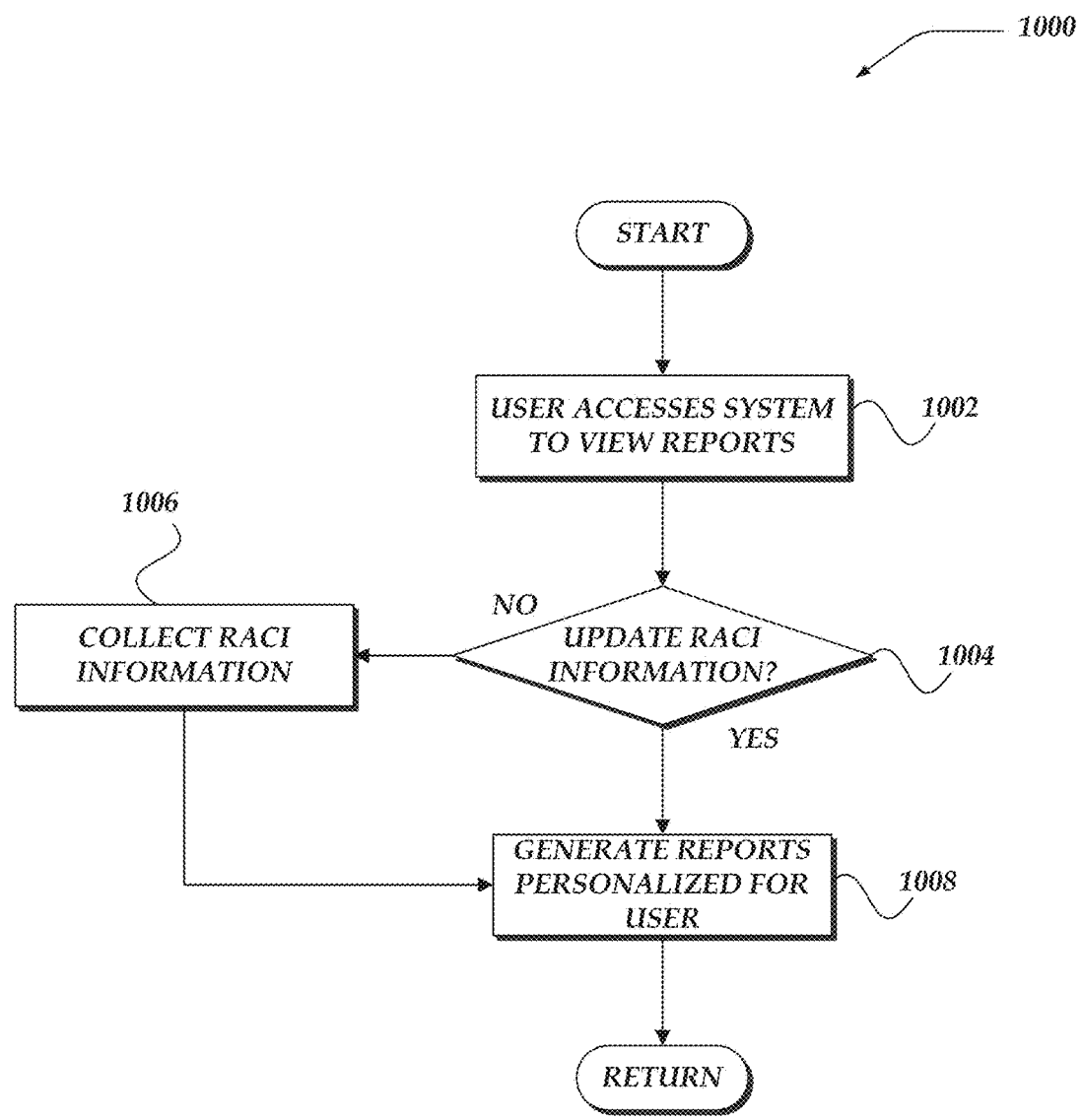
FIG. 10 illustrates an overview flowchart for a process for report generation based on user responsibility in accordance with one or more of the various embodiments.

FIG. 10 illustrates an overview flowchart for process 1000 for report generation based on user responsibility in accordance with one or more of the various embodiments. After a start block, at block 1002, in one or more of the various embodiments, a user may access a modeling platform. In one or more of the various embodiments, the user may log into the modeling platform via a web application or web page hosted on a network computer. Or, in some embodiments, the user may access the platform via a client computer through a client applications, such as resource modeling client application 222, or the like. The user may provide various credentials (e.g., user name, password, or the like) that one or more applications, such as, resource modeling engine 322, or the like, may validate to authenticate the user.

At decision block 1004, in one or more of the various embodiments, if the RACI information associated with the user needs to be updated, control may flow block 1006; otherwise, control may flow to block 1008. In one or more of the various embodiments, as mentioned above, there may be one or more circumstances that may require the RACI information associated with the user to be updated, such as, first time log in for user, changes in the underlying data models, expiry of a periodic update/confirm timer, or the like.

At block 1006, in one or more of the various embodiments, the may be provided a user-interface for updating their RACI information. In one or more of the various embodiments, the RACI information that is currently associated with the user may be displayed. Accordingly, in some embodiments, the user may be enabled to confirm the current RACI information.

In one or more of the various embodiments, the RACI engine may be arranged to generate suggestions or proposed RACI information for the user. The suggestions may be generated based on other information known about the user. For example, the user may be associated with one or more data objects, such as, departments, projects, business units, products, other persons in the organization, geographic locations, or the like.

In one or more of the various embodiments, during ingestion of raw data sets used in resource modeling, the modeling engine may discover correlations between departments, projects, business units, products, other persons in the organization, geographic locations, or the like, and the users. For example, in some embodiments, some raw data may include project information that includes one or more fields listing project managers or other team members. Thus, in this example, the modeling engine may discover one or more correlations between some users and some data objects. Accordingly, in some embodiments, the RACI engine may be provided correlation information that may be used to infer RACI information defaults to present to the user.

In one or more of the various embodiments, such defaults may include proposing Responsible/Interests for individual data objects. Also, in some embodiments, RACI engines may be arranged to limit the use of defaults to encourage users to actively engage in the RACI information collection process. For example, in some embodiments, providing generous defaulting may encourage users to reflexively accept the proposed defaults rather than actively or critically providing RACI information.

Accordingly, in one or more of the various embodiments, the RACI engine may be arranged to execute one or more rule-based policies obtained from configuration information to determine RACI information collection defaults, if any.

In one or more of the various embodiments, the RACI engine may be arranged to identify data objects (or portions of the data models) that do not have one or more users indicating that they are responsible or interested. In one or more of the various embodiments, the RACI engine may generate notifications to the user or other users regarding data objects that do not have declared responsible or interested users.

At block 1008, in one or more of the various embodiments, a report engine may generate one or more reports for the user. In one or more of the various embodiments, if the RACI information is already known for the user, the report engine may generate reports that are personalized for the user. In some embodiments, the modeling platform may provide an initial user interface (a dashboard) that is personalized based on the RACI information associated with the user.

Next, control may be returned to a calling process.

Figure 11:
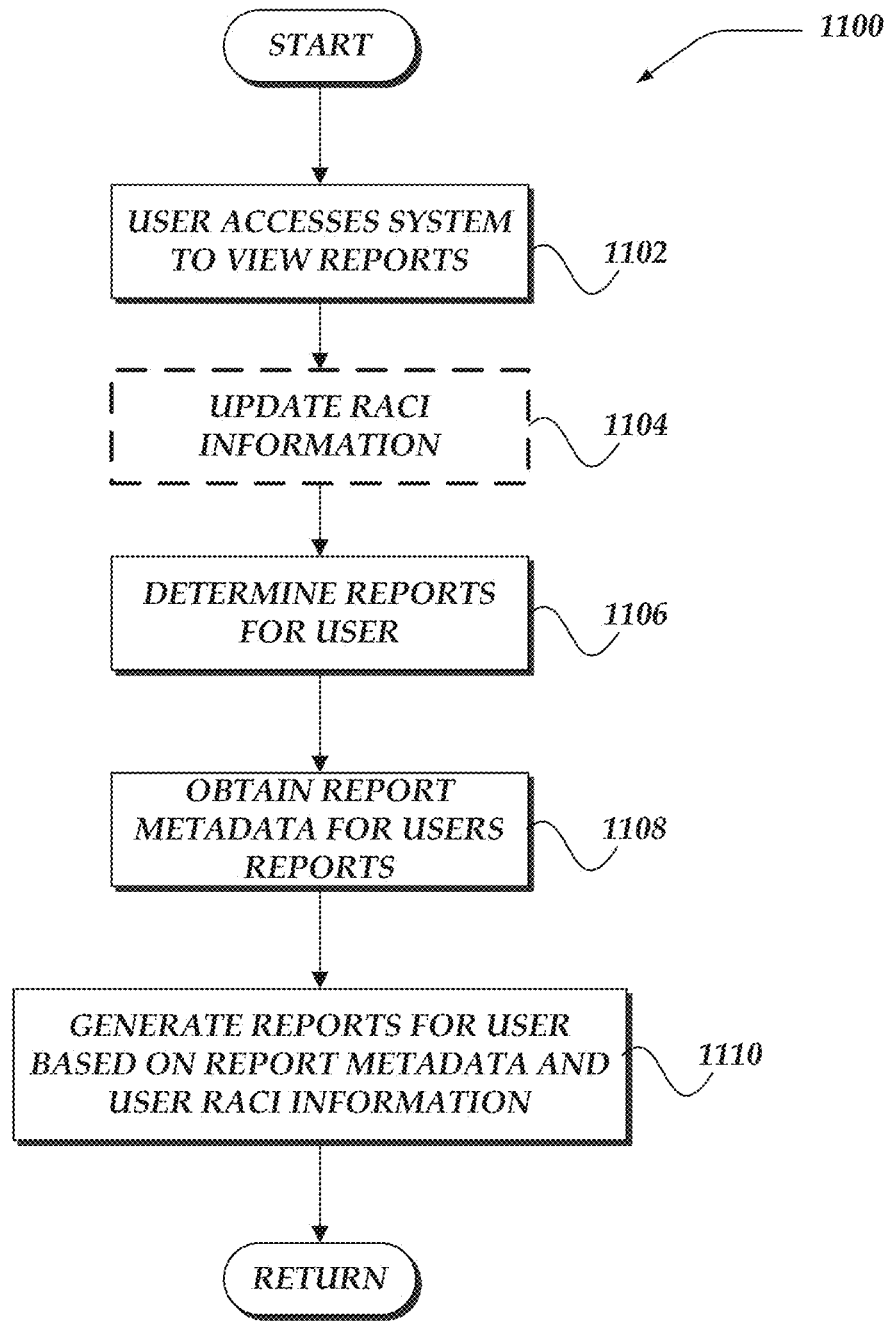
FIG. 11 illustrates a flowchart for a process for report generation based on user responsibility in accordance with one or more of the various embodiments.

FIG. 11 illustrates a flowchart for process 1100 for report generation based on user responsibility in accordance with one or more of the various embodiments. After a start block, at block 1102, in one or more of the various embodiments, a user may access the modeling platform to view one or more reports. As described a above, users may access the modeling platform to view one or more reports that may provide interactive visualizations based on one or more data models.

At block 1104, optionally, in one or more of the various embodiments, a RACI engine may be instantiated to update the RACI information that may be associated with the user. See, FIG. 10 for a more detailed description of collecting RACI information.

In some embodiments, this block may be optional because there may already be current RACI information associated with the user. Accordingly, in some cases, the actions included in this block may be skipped.

At block 1106, in one or more of the various embodiments, a report engine may be instantiated to determine one or more reports for the user. In one or more of the various embodiments, the report engine may select one or more reports for the user. In some embodiments, the particular reports may be selected based on the RACI information associated with the user. Also, in one or more of the various embodiments, the reports may be selected based on other configuration information, user preferences, group references, organizational customization, user input, or the like, or combination thereof. For example, in some embodiments, the user may select one or more reports from a displayed lists of available reports. Also, for example, the modeling platform may be configured to launch one or more initial reports based on one or more groups or roles that the user may be associated with.

At block 1108, in one or more of the various embodiments, the report engine may obtain the report metadata for the one or more selected reports. In one or more of the various embodiments, the report metadata may be stored in a data store and referenced the report selector mechanism. For example, a user may select to view a report described as a Server Report. Accordingly, based on the users selection, the report metadata that corresponds the Server Report may be retrieved from data storage, such as, report metadata data storage 316.

At block 1110, in one or more of the various embodiments, the report engine may generate the one or more reports based on the report metadata and the RACI information that may be associated with the user. In one or more of the various embodiments, the report engine may be arranged to parse or otherwise traverse the report metadata and synthesize a report template by filling in or expanding elements defined in the report metadata based on RACI information values.

For example, in one or more of the various embodiments, if the report is a Server Report, its report metadata may define one or more elements associated with Server data objects. Accordingly, if the user has RACI information that identifies or matches Server data objects associated with data objects (e.g., departments) that the user is responsible for, those Server data objects may be included in the report rather showing report information for all of the Servers in the organization. Also, in one or more of the various embodiments, the report metadata combined with RACI information may enable to report engine to generate a report that focuses on the Servers the user has indicated an interest rather than all servers.

Further, in one or more of the various embodiments, the application of the RACI information acts as a filter that improves the performance of the report engine and the modeling platform in general. The queries, computations, grouping, sorting, rendering, or the like, required for generating a particular report are automatically limited to a minimum set that corresponds to the interest of the user. Absent the application of the RACI information, the report engine would have to process the queries, computations, grouping, sorting, rendering, or the like, on large result sets that include data that is not relevant to the user. Next, control may be returned to a calling process.

Figure 12:
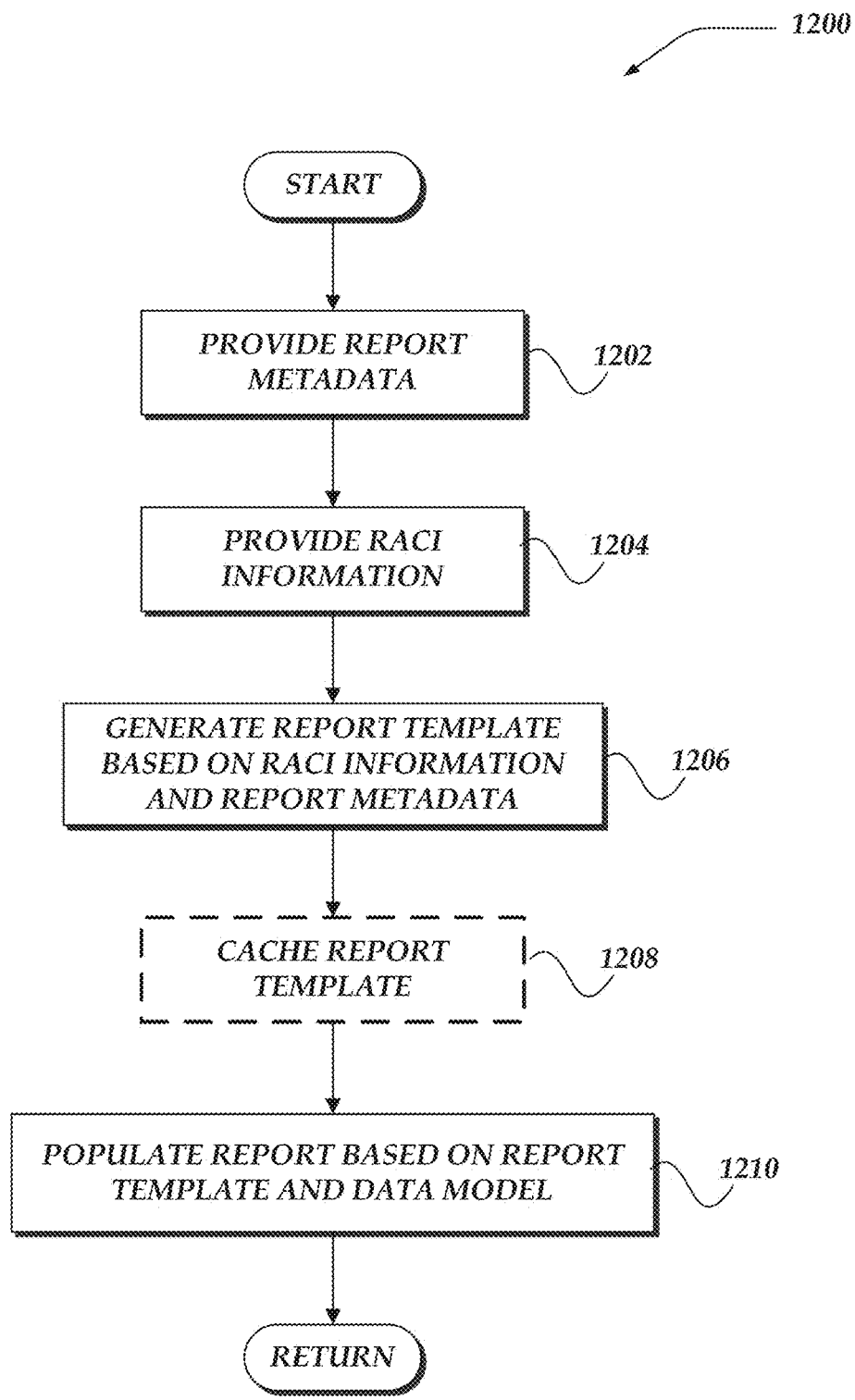
FIG. 12 illustrates a flowchart for a process for generating reports using RACI information in accordance with one or more of the various embodiments.

FIG. 12 illustrates a flowchart for process 1200 for generating reports using RACI information in accordance with one or more of the various embodiments. After a start block, at block 1202, in one or more of the various embodiments, report metadata may be provided. In one or more of the various embodiments, report metadata may be associated with one or more classes or types of reports. Accordingly, in some embodiments, the modeling platform may present a list or display of one or more reports that a user may select from. Likewise, as mentioned earlier, there may be one or more defaults applied to automatically select reports or display subsets of the reports that may be selectable by the user.

At block 1204, in one or more of the various embodiments, the RACI information that may be associated with the user may be provided. In some embodiments, a report engine may retrieve the RACI information from a database, or the like, that indexes RACI information by users. For example, the report engine may be arranged to retrieve the user's RACI information from RACI data 308.

At block 1206, in one or more of the various embodiments, the report engine may generate a report template based on the RACI information and the report metadata. In one or more of the various embodiments, report templates may be an intermediate data structure synthesized from the RACI information and the report metadata. The report template may include elements or items that reference the data objects and data object fields that may be used in the report.

In one or more of the various embodiments, report templates may represent the layout of the report, including one or more of labels, query objects, filter objects, or the like, that may be used provide the report. Report templates may include layout information, and so on, absent the actual data for populating the report values.

In one or more of the various embodiments, one or more features defined in the report metadata may be expanded based on the RACI information and the geometry of the data model. IN some embodiments, report engine may be optimized for processing expandable features (e.g., feature 810). In some embodiments, the report engine may employ specialized data structures, such as, data structure 612 to enable faster lookup of dependent objects or parent objects. Accordingly, in one or more of the various embodiments, rather than having to perform compute or memory intensive graph traversals of the data models, the report engine may derive the geometry or neighbor information for data objects just from the identity of data objects. For example, data structures, such as, data structure 612 are optimized for determining the ancestors of data objects in a data model.

Further, in some embodiments, additional data structures (not shown) may be generated to trace the descendants of data objects without requiring an expensive graph traversal. For example, (referring the FIG. 6) a data structure similar to data structure may have level columns that trace the ancestors of object of interest. Accordingly, for example, node K in data model would be associated with a row such as Obj=K, Level 1=E, Level 2=B, Level 3=A. Accordingly, looking up descendant objects or ancestor objects is fast operation that depends on the indexing method used to index the identity of object of interest, rather than slower traversals of the data model. Note, in production environments, data models may include thousands of nodes (e.g., data objects) or millions of data object items making this optimization a significant improvement to the performance of the report engine.

In one or more of the various embodiments, the report engine may determine one or more anchor points in the data model based on flattened data structures such as data structure. Accordingly, the anchor points in the data model may be used to locate the ancestors or descendent objects that should be included in the report template. In one or more of the various embodiments, an index in the flattened version of the data model (e.g., data structure 612) that corresponds to a geometry of the data model may be used to provide the one or more anchor points absent a traversal of the geometry of the data model.

Also, in one or more of the various embodiments, providing the report template may include, including one or more of date formats, time formats, units, colors, fonts, punctuation, time zones, languages, currencies, or calendar formatting based on geolocation information provided by one or more sensors associated with a computer.

At block 1208, optionally, in one or more of the various embodiments, the report engine may cache the report template. In some embodiments, report templates may be saved for future use because report templates may not require updating unless the RACI information, the report metadata, or data objects associated with the report template have changed. Accordingly, in some embodiments, the report engine may be arranged to cache report templates. Thus, in one or more of the various embodiments, before process 1200 executes block 1202, block 1204, or block 1206, the report engine may test a last-modified date of the RACI information and report template. If they are unchanged, the report engine may use a cached report template rather than generating it again.

Also, in one or more of the various embodiments, the modeling engine may indicate that the data model itself has changed. Accordingly, in some embodiments, the report engine may examine the changed, removed, or added data objects to determine if modification to the data model may impact the report. For example, if new dependent objects are added to a data objects referenced in report metadata, the report template may need to be regenerated.

This block is marked as optional because caching report templates may be omitted. Accordingly, in some cases, the actions included in this block may be skipped.

At block 1210, in one or more of the various embodiments, the report engine may populate the report based on the report template and the data model. In one or more of the various embodiments, the report engine may execute one or more queries that may be included or associated with the report template. In some embodiments, the queries may be directed to a modeling engine or a database that is associated with the modeling engine. Accordingly, result sets associated with the one or more queries may be used to create the report.

Next, control may be returned to a calling process.

Figure 13:
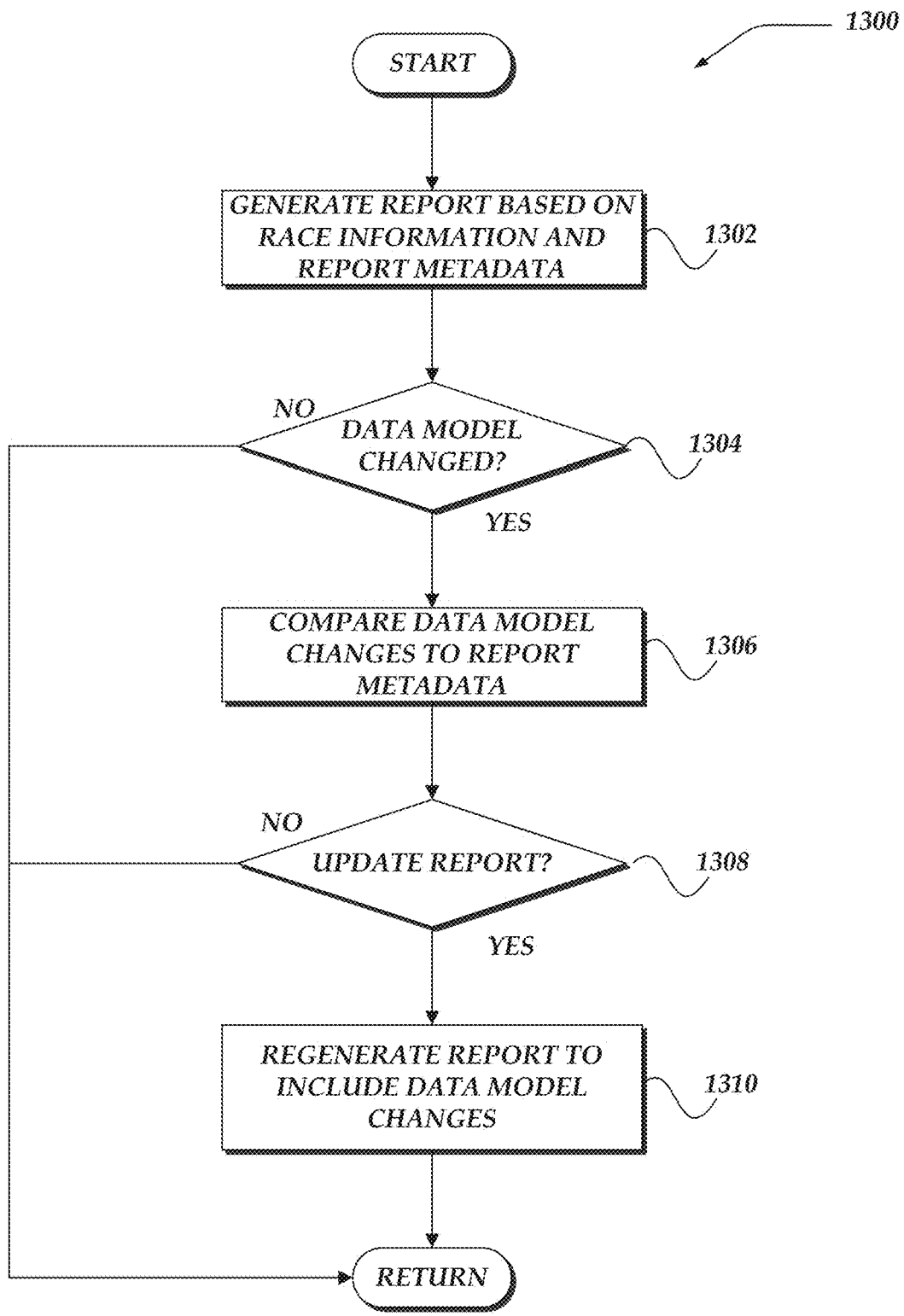
FIG. 13 illustrates a flowchart for a process for generating updating reports in accordance with one or more of the various embodiments.

FIG. 13 illustrates a flowchart for process 1300 for generating updating reports in accordance with one or more of the various embodiments. After a start block, at block 1302, in one or more of the various embodiments, a report engine may be instantiated to generate one or more reports based on RACI information and report metadata.

At decision block 1304, in one or more of the various embodiments, if the data model has changed, control may flow to block 1306; otherwise, control may be returned to a calling process.

At block 1306, in one or more of the various embodiments, the report engine may be arranged to compare the changes in the data model to the report metadata. In one or more of the various embodiments, the report engine may traverse the data model to identify changes made to the model. These may include various modifications, such as, the addition of data objects; the removal of data objects; moving data objects within the model; modifications to data objects; or the like, or combination thereof.

In one or more of the various embodiments, the report engine may iterate through the discovered modifications, if any, and compare them to the data objects referenced in the report metadata.

At decision block 1308, in one or more of the various embodiments, if the modifications to the data model trigger a report update, control may flow to block 1310; otherwise, control may be returned to a calling process.

In one or more of the various embodiments, some modifications to a data model may be unrelated to the report or its associated report metadata. For example, in some embodiments, the modifications may affect data objects unrelated to the data objects referenced in the report metadata. Accordingly, the current report may be unaffected.

In some embodiments, in some cases, changes made to the data model may be incompatible with a report or its report metadata. Accordingly, in some embodiments, the report engine may generate an alert or notification and abort the report generation process.

At block 1310, in one or more of the various embodiments, the report engine may regenerate the report to incorporate the data model modifications. In some cases, the data model modifications may be data value oriented rather than model oriented. Accordingly, the same queries and report template may be used since the item values displayed in the report may change but not its structure, layout, elements, or the like. For example, the Engineering department may have gone from having 100 servers to 110 servers. This type of modification may not modify the geometry of the data model. Accordingly, in this example, report template may be remain valid but one or more values displayed in the report change to reflect the modification to the server count.

Next, control may be returned to a calling process.

What is claimed as new and desired to be protected by Letters Patent of the United States is:

1. A method for generating reports for visualizing data models using a computer that includes one or more hardware processors, where each step of the method is performed by the one or more hardware processors, comprising:
    instantiating a RACI (Responsibility, Accountable, Consulted, and Informed) engine to perform actions, including:
        obtaining RACI information for a user, wherein the RACI information indicates the user's responsibility or interest in one or more data objects included in a data model;
        comparing the data model to other RACI information, wherein the other RACI information is associated with other users;
        determining one or more other data objects that are associated with two or more responsible users; and
        providing one or more notifications that the two or more users have responsibility for the same determined data objects; and
    instantiating a report engine to perform further actions, including:
        providing metadata that is associated with a report for visualizing one or more portions of the data model;
        providing one or more anchor points in the data model based on the metadata, the RACI information, and an index in a flattened version of the data model that corresponds to a geometry of the data model, wherein the one or more anchor points are provided absent a traversal of the geometry of the data model;
        providing a report template based on the one or more anchor points, the RACI information, and the metadata, wherein the report template includes references to one or more data objects that are automatically selected based on the metadata and the one or more anchor points;
        employing geolocation information from a Global Positioning System (GPS) device at a client computer to determine one or more features to include in a report presented to the user of the client computer, and wherein the one or more features are used by one or more of the report, data objects, data models, report meta-data, file systems, RACI information, user-interfaces, internal processes or databases; and
        displaying the report on a hardware display of the user's client computer based on the report template and included features, wherein the report provides one or more visualizations based on values associated with the one or more data objects, and wherein the one or more features enhance the one or more of the report, data objects, data models, report meta-data, file systems, RACI information, user-interfaces, internal processes or databases, and wherein the one or more features include one or more of time zones, languages, currencies, or calendar formatting, and wherein the one or more features are included when the client computer is located at a particular geo-location.

2. The method of claim 1, wherein obtaining the RACI information further comprises:
    displaying a user-interface that lists a plurality of data objects that are included in the data model;
    tagging the one or more data objects as a responsibility of the user or of interest to the user based on one or more selections of the one or more data objects that are performed in the user interface; and
    including one or more references to the one or more data objects in the RACI information for the user.

3. The method of claim 1, wherein performing actions with the report engine, further comprises, providing another report template based on one or more other anchor points, other RACI information, and the metadata, wherein the other report template includes references to one or more other data objects that are selected based on the other RACI information that is associated with the other user.

4. The method of claim 1, wherein providing the report template, further comprises, including one or more of date formats, time formats, units, colors, fonts, punctuation, time zones, languages, currencies, or calendar formatting based on geolocation information provided by one or more sensors associated with a computer.

5. The method of claim 1, wherein the RACI engine performs further actions, comprising:
    comparing the data model to other RACI information, wherein the other RACI is associated with other users;
    determining one or more other data objects based on an absence of one or more indications of user responsibility or user interest in the one or more other data objects; and
    providing one or more notifications that the one or more other data objects are omitted from the other RACI information.

6. The method of claim 1, wherein the RACI engine performs further actions, comprising:
    associating one or more of the one or more data objects with the user based on one or more inferences made by an ingestion engine, wherein the one or more inferences are derived from one or more raw data sets used to generate the data model.

7. A system for generating reports for visualizing data models, comprising:
    a network computer, comprising:
        a transceiver that communicates over the network;
        a memory that stores at least instructions; and
        one or more processor devices that execute instructions that perform actions, including:
            instantiating a RACI (Responsibility, Accountable, Consulted, and Informed) engine to perform actions, including:
                obtaining RACI information for a user, wherein the RACI information indicates the user's responsibility or interest in one or more data objects included in a data model;
                comparing the data model to other RACI information, wherein the other RACI information is associated with other users;
                determining one or more other data objects that are associated with two or more responsible users; and
                providing one or more notifications that the two or more users have responsibility for the same determined data objects; and instantiating a report engine to perform further actions, including:
  providing metadata that is associated with a report for visualizing one or more portions of the data model;
  providing one or more anchor points in the data model based on the metadata, the RACI information, and an index in a flattened version of the data model that corresponds to a geometry of the data model, wherein the one or more anchor points are provided absent a traversal of the geometry of the data model;
  providing a report template based on the one or more anchor points, the RACI information, and the metadata, wherein the report template includes references to one or more data objects that are automatically selected based on the metadata and the one or more anchor points; and
a client computer, comprising:
a client computer transceiver that communicates over the network;
a client computer memory that stores at least instructions; and
one or more processor devices that execute instructions that perform actions, including:
  employing geolocation information from a Global Positioning System (GPS) device at a client computer to determine one or more features to include in a report presented to the user of the client computer, and wherein the one or more features are used by one or more of the report, data objects, data models, report meta-data, file systems, RACI information, user-interfaces, internal processes or databases; and
  displaying the report on a hardware display of the user's client computer based on the report template and included features, wherein the report provides one or more visualizations based on values associated with the one or more data objects, and wherein the one or more features enhance the one or more of the report, data objects, data models, report meta-data, file systems, RACI information, user-interfaces, internal processes or databases, and wherein the one or more features include one or more of time zones, languages, currencies, or calendar formatting, and wherein the one or more features are included when the client computer is located at a particular geo-location.

8. The system of claim 7, wherein obtaining the RACI information further comprises:
  displaying a user-interface that lists a plurality of data objects that are included in the data model;
  tagging the one or more data objects as a responsibility of the user or of interest to the user based on one or more selections of the one or more data objects that are performed in the user interface; and
  including one or more references to the one or more data objects in the RACI information for the user.

9. The system of claim 7, wherein performing actions with the report engine, further comprises, providing another report template based on one or more other anchor points, other RACI information, and the metadata, wherein the other report template includes references to one or more other data objects that are selected based on the other RACI information that is associated with the other user.

10. The system of claim 7, wherein providing the report template, further comprises, including one or more of date formats, time formats, units, colors, fonts, punctuation, time zones, languages, currencies, or calendar formatting based on geolocation information provided by one or more sensors associated with the client computer or the network computer.

11. The system of claim 7, wherein the RACI engine performs further actions, comprising:
  comparing the data model to other RACI information, wherein the other RACI is associated with other users;
  determining one or more other data objects based on an absence of one or more indications of user responsibility or user interest in the one or more other data objects; and
  providing one or more notifications that the one or more other data objects are omitted from the other RACI information.

12. The system of claim 7, wherein the RACI engine performs further actions, comprising:
  associating one or more of the one or more data objects with the user based on one or more inferences made by an ingestion engine, wherein the one or more inferences are derived from one or more raw data sets used to generate the data model.

13. A processor readable non-transitory storage media that includes instructions for generating reports for visualizing data models, wherein execution of the instructions by one or more hardware processors performs actions, comprising:
  instantiating a RACI (Responsibility, Accountable, Consulted, and Informed) engine to perform actions, including:
    obtaining RACI information for a user, wherein the RACI information indicates the user's responsibility or interest in one or more data objects included in a data model;
    comparing the data model to other RACI information, wherein the other RACI information is associated with other users;
    determining one or more other data objects that are associated with two or more responsible users; and
    providing one or more notifications that the two or more users have responsibility for the same determined data objects; and
  instantiating a report engine to perform further actions, including:
    providing metadata that is associated with a report for visualizing one or more portions of the data model;
    providing one or more anchor points in the data model based on the metadata, the RACI information, and an index in a flattened version of the data model that corresponds to a geometry of the data model, wherein the one or more anchor points are provided absent a traversal of the geometry of the data model;
    providing a report template based on the one or more anchor points, the RACI information, and the metadata, wherein the report template includes references to one or more data objects that are automatically selected based on the metadata and the one or more anchor points;
    employing geolocation information from a Global Positioning System (GPS) device at a client computer to determine one or more features to include in a report presented to the user of the client computer, and wherein the one or more features are used by one or more of the report, data objects, data models, report meta-data, file systems, RACI information, user-interfaces, internal processes or databases; and
    displaying the report on a hardware display of the user's client computer based on the report template and included features, wherein the report provides one or more visualizations based on values associated with the one or more data objects, and wherein the one or more features enhance the one or more of the report, data objects, data models, report meta-data, file systems, RACI information, user-interfaces, internal processes or databases, and wherein the one or more features include one or more of time zones, languages, currencies, or calendar formatting, and wherein the one or more features are included when the client computer is located at a particular geo-location.

14. The media of claim 13, wherein obtaining the RACI information further comprises:
displaying a user-interface that lists a plurality of data objects that are included in the data model;
tagging the one or more data objects as a responsibility of the user or of interest to the user based on one or more selections of the one or more data objects that are performed in the user interface; and
including one or more references to the one or more data objects in the RACI information for the user.

15. The media of claim 13, wherein performing actions with the report engine, further comprises, providing another report template based on one or more other anchor points, other RACI information, and the metadata, wherein the other report template includes references to one or more other data objects that are selected based on the other RACI information that is associated with the other user.

16. The media of claim 13, wherein providing the report template, further comprises, including one or more of date formats, time formats, units, colors, fonts, punctuation, time zones, languages, currencies, or calendar formatting based on geolocation information provided by one or more sensors associated with a computer.

17. The media of claim 13, wherein the RACI engine performs further actions, comprising:
comparing the data model to other RACI information, wherein the other RACI is associated with other users;
determining one or more other data objects based on an absence of one or more indications of user responsibility or user interest in the one or more other data objects; and
providing one or more notifications that the one or more other data objects are omitted from the other RACI information.

18. The media of claim 13, wherein the RACI engine performs further actions, comprising:
associating one or more of the one or more data objects with the user based on one or more inferences made by an ingestion engine, wherein the one or more inferences are derived from one or more raw data sets used to generate the data model.

19. A network computer for generating reports for visualizing data models, comprising:
a transceiver that communicates over the network;
a memory that stores at least instructions; and
one or more processor devices that execute instructions that perform actions, including:
instantiating a RACI (Responsibility, Accountable, Consulted, and Informed) engine to perform actions, including:
obtaining RACI information for a user, wherein the RACI information indicates the user's responsibility or interest in one or more data objects included in a data model;
comparing the data model to other RACI information, wherein the other RACI information is associated with other users;
determining one or more other data objects that are associated with two or more responsible users; and
providing one or more notifications that the two or more users have responsibility for the same determined data objects; and
instantiating a report engine to perform further actions, including:
providing metadata that is associated with a report for visualizing one or more portions of the data model;
providing one or more anchor points in the data model based on the metadata, the RACI information, and an index in a flattened version of the data model that corresponds to a geometry of the data model, wherein the one or more anchor points are provided absent a traversal of the geometry of the data model;
providing a report template based on the one or more anchor points, the RACI information, and the metadata, wherein the report template includes references to one or more data objects that are automatically selected based on the metadata and the one or more anchor points;
employing geolocation information from a Global Positioning System (GPS) device at a client computer to determine one or more features to include in a report presented to the user of the client computer, and wherein the one or more features are used by one or more of the report, data objects, data models, report meta-data, file systems, RACI information, user-interfaces, internal processes or databases; and
displaying the report on a hardware display of the user's client computer based on the report template and included features, wherein the report provides one or more visualizations based on values associated with the one or more data objects, and wherein the one or more features enhance the one or more of the report, data objects, data models, report meta-data, file systems, RACI information, user-interfaces, internal processes or databases, and wherein the one or more features include one or more of time zones, languages, currencies, or calendar formatting, and wherein the one or more features are included when the client computer is located at a particular geo-location.

20. The network computer of claim 19, wherein obtaining the RACI information further comprises:
displaying a user-interface that lists a plurality of data objects that are included in the data model;
tagging the one or more data objects as a responsibility of the user or of interest to the user based on one or more selections of the one or more data objects that are performed in the user interface; and
including one or more references to the one or more data objects in the RACI information for the user.

21. The network computer of claim 19, wherein performing actions with the report engine, further comprises, providing another report template based on one or more other anchor points, other RACI information, and the metadata, wherein the other report template includes references to one or more other data objects that are selected based on the other RACI information that is associated with the other user.

22. The network computer of claim 19, wherein providing the report template, further comprises, including one or more of date formats, time formats, units, colors, fonts, punctuation, time zones, languages, currencies, or calendar formatting based on geolocation information provided by one or more sensors associated with a computer.

23. The network computer of claim 19, wherein the RACI engine performs further actions, comprising:
   comparing the data model to other RACI information, wherein the other RACI is associated with other users;
   determining one or more other data objects based on an absence of one or more indications of user responsibility or user interest in the one or more other data objects; and
   providing one or more notifications that the one or more other data objects are omitted from the other RACI information.

24. The network computer of claim 19, wherein the RACI engine performs further actions, comprising, associating one or more of the one or more data objects with the user based on one or more inferences made by an ingestion engine, wherein the one or more inferences are derived from one or more raw data sets used to generate the data model.

\* \* \* \* \*